United States Patent
Mun et al.

(10) Patent No.: US 10,607,597 B2
(45) Date of Patent: Mar. 31, 2020

(54) SPEECH SIGNAL RECOGNITION SYSTEM AND METHOD

(71) Applicant: Samsung Electronics Co., Ltd., Suwon-si (KR)

(72) Inventors: Minyoung Mun, Seoul (KR); SangHyun Yoo, Seoul (KR); Young Sang Choi, Seongnam-si (KR); Ki Soo Kwon, Seoul (KR); Hodong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 15/916,512

(22) Filed: Mar. 9, 2018

(65) Prior Publication Data
US 2019/0088251 A1  Mar. 21, 2019

(30) Foreign Application Priority Data
Sep. 18, 2017 (KR) .................... 10-2017-0119659

(51) Int. Cl.
*G10L 15/16* (2006.01)
*G10L 15/06* (2013.01)
(Continued)

(52) U.S. Cl.
CPC ............ *G10L 15/063* (2013.01); *G10L 15/07* (2013.01); *G10L 15/083* (2013.01);
(Continued)

(58) Field of Classification Search
None
See application file for complete search history.

(56) References Cited

U.S. PATENT DOCUMENTS 7,225,125 B2 * 5/2007 Bennett ................. G10L 15/005
 704/233
7,643,985 B2 * 1/2010 Horvitz ................. G06F 17/289
 704/2

(Continued)

FOREIGN PATENT DOCUMENTS

JP  2007-286174 A  11/2007
JP  2011-64913 A   3/2011
(Continued)

*Primary Examiner* — Satwant K Singh
(74) *Attorney, Agent, or Firm* — NSIP Law

(57) ABSTRACT

A speech signal recognition method, apparatus, and system. The speech signal recognition method may include obtaining by or from a terminal an output of a personalization layer, with respect to a speech signal provided by a user of the terminal, having been implemented by input of the speech signal to the personalization layer, the personalization layer being previously trained based on speech features of the user, implementing a global model by providing the obtained output of the personalization layer to the global model, the global model being configured to output a phonemic signal indicating a phoneme included in the speech signal through the global model being previously trained based on speech features common to a plurality of users, and re-training the personalization layer based on the phonemic signal output from the global model, where the personalization layer and the global model collectively represent an acoustic model.

19 Claims, 7 Drawing Sheets

(51) Int. Cl.
  *G10L 15/28* (2013.01)
  *G10L 15/187* (2013.01)
  *G10L 15/08* (2006.01)
  *G10L 15/07* (2013.01)
  *G10L 15/02* (2006.01)

(52) U.S. Cl.
  CPC ............ *G10L 15/187* (2013.01); *G10L 15/28* (2013.01); *G10L 15/16* (2013.01); *G10L 2015/025* (2013.01)

(56) References Cited

U.S. PATENT DOCUMENTS

| | | | |
|---|---|---|---|
| 8,655,659 B2 * | 2/2014 | Wang | G10L 13/033 |
| | | | 704/231 |
| 2015/0248884 A1 * | 9/2015 | Ljolje | G10L 15/07 |
| | | | 704/243 |
| 2017/0133007 A1 * | 5/2017 | Drewes | G10L 15/063 |
| 2017/0154033 A1 * | 6/2017 | Lee | G06F 17/218 |
| 2019/0206389 A1 * | 7/2019 | Kwon | G10L 15/063 |

FOREIGN PATENT DOCUMENTS

| | | |
|---|---|---|
| JP | 2013-178384 A | 9/2013 |
| KR | 10-2011-0071197 A | 6/2011 |
| KR | 10-1289081 B1 | 7/2013 |
| KR | 10-2016-0066347 A | 6/2016 |

* cited by examiner

SPEECH SIGNAL RECOGNITION SYSTEM AND METHOD

CROSS-REFERENCE TO RELATED APPLICATIONS

This application claims the benefit under 35 USC § 119(a) of Korean Patent Application No. 10-2017-0119659 filed on Sep. 18, 2017 in the Korean Intellectual Property Office, the entire disclosure of which is incorporated herein by reference for all purposes.

BACKGROUND

1. Field

The following description relates to speech signal recognition.

2. Description of Related Art

Recently, technological automation of speech recognition has been implemented through processor implemented models or neural network models, as specialized computational architectures, which after substantial training may provide computationally intuitive and specialized mappings between input patterns and output patterns. In such automated speech recognition, recognition accuracies of the computational architectures may be dependent on various factors such as a surrounding environment and a current state of the user when the user utters a speech.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented speech signal recognition method includes obtaining by or from a terminal an output of a personalization layer, with respect to a speech signal provided by a user of the terminal, having been implemented by input of the speech signal to the personalization layer, the personalization layer being previously trained based on speech features of the user, implementing a global model by providing the obtained output of the personalization layer to the global model, the global model being configured to output a phonemic signal indicating a phoneme included in the speech signal through the global model being previously trained based on speech features common to a plurality of users, and re-training the personalization layer based on the phonemic signal output from the global model, wherein the personalization layer and the global model collectively represent an acoustic model.

The method may further include implementing a language model to recognize one or more words based upon results of the implementation of the global model, and indicating a result of the recognized one or more words.

The terminal may obtain the global model from a speech signal recognition server and perform the implementing of the global model, and the terminal may perform the re-training of the personalization layer.

The terminal may perform the re-training of the personalization layer in furtherance of a retraining of the acoustic model initiated by a retraining of the global model by a speech signal recognition server based on the speech signal.

The method may further include performing a next speech recognition by the terminal by obtaining the re-trained personalization layer, and implementing a latest global model resulting from a further re-training of the re-trained global model by the speech signal recognition server performed to re-train another acoustic model, represented by a combination of a different personalization layer personalized to speech features of another user and the re-trained global model, The terminal may obtains the global model from a speech signal recognition server and perform the re-training of the personalization layer using the obtained global model based on a combining of the personalization layer and the obtained global model to generate the acoustic model.

The speech signal recognition server may perform the implementing of the global model to complete an implementation of the acoustic model to indicate the phoneme.

The speech signal recognition server may further perform another implementing of the global model to complete an implementation of another acoustic model for a speech of another user dependent on an implementation of a different personalization layer for the other user, with the different personalization layer and the global model collectively representing the other acoustic model.

A speech signal recognition server may perform the obtaining of the output of the personalization layer and perform the implementing of the global model, and the speech signal recognition server may perform the re-training of the personalization layer, wherein the performing of the re-training may include forwarding the re-trained personalization layer to the terminal for use in a subsequent speech recognition.

The global model may be configured to be utilized in speech recognition for each of the plurality of users in respective combination with different personalization layers particular to each of the plurality of users, and the global model may be stored in a speech signal recognition server configured with a language model to change results of each of the speech recognition for each of the plurality of users to respective text signals, where the different personalization layers may be configured in different terminals and respectively trained for speech features of corresponding different users.

The method may further include determining whether to implement the personalization layer for an input speech signal based on a determined connection state between the terminal and the speech signal recognition server.

The implementing of the global model may include transmitting the output of the personalization layer from the terminal to the speech signal recognition server, and the speech signal recognition server may input the transmitted output into the global model to output the phonemic signal.

In one general aspect, a processor implemented speech signal recognition method uses an acoustic model neural network including a personalization neural network portion of a terminal and a global neural network portion of a speech signal recognition server, with the method including obtaining a speech of a user by or from the terminal, obtaining the personalization neural network portion and the global neural network portion, combining the obtained personalization neural network portion and the obtained global neural network portion to configure the acoustic model neural network, implementing the acoustic model neural network for the obtained speech to identify a phoneme included in the speech, and indicating a recognition result based on the implemented acoustic model, wherein the personalization layer neural network portion is a portion of the acoustic model neural network particularly trained based on speech features of the user and the global neural network portion is another portion of the acoustic model neural network trained based on speech features common to a plurality of users.

The implementing of the acoustic model neural network may include inputting the obtained speech to the acoustic model neural network, implementing parameters of the personalization neural network portion based on the inputting, outputting results of the implementing of the parameters of the personalization neural network portion to the global neural network portion, and then implementing parameters of the global neural network portion based on the outputting of the results of the implementing of the parameters of the personalization neural network portion to the global neural network portion, to identify the phoneme included in the speech based on results of the implementing of the parameters of the global neural network portion.

The method may be performed by the terminal or the speech signal recognition server, where when the terminal performs the obtaining of the global neural network portion the terminal may request the global neural network portion from the speech signal recognition server and receive the global neural network portion in response to the request, and when the speech signal recognition server performs the obtaining of the personalization neural network portion the speech signal recognition server may request the personalization neural network portion from the terminal and receive the personalization neural network portion in response to the request.

In the combining of the obtained personalization neural network portion and the obtained global neural network portion to configure the acoustic model neural network, obtained parameters of the personalization neural network portion may be positioned in the acoustic model neural network for one or more layers of the acoustic model neural network that are distinct from layers of the acoustic model neural network representing the global neural network portion.

The obtained parameters of the personalization neural network portion may be positioned in the acoustic model neural network for at least two non-sequential layers of the acoustic model neural network, where at least one layer of the acoustic model neural network including obtained parameters of the global neural network portion may be positioned between the two non-sequential layers of the acoustic model neural network.

The indicating of the recognition result based on the implemented acoustic model may include providing the identified phoneme to a language model to determine one or more words as text recognition of the speech, and indicating the text recognition by displaying or audibly outputting the determined one or more words, displaying or audibly outputting information of a service or function to be performed by the terminal, or implementing the service or function, corresponding to the determined one or more words, or displaying or audibly outputting a recognized inquiry or results of the recognized inquiry corresponding to the determined one or more words.

The terminal may perform the combining and the implementing of the acoustic model neural network, and the method may further include re-training the acoustic model neural network by the terminal to adjust one or more parameters of the personalization neural network portion of the acoustic model neural network to be more accurately trained based on the speech features of the user, and store the adjusted one or more parameters in the terminal for subsequent speech recognition.

The speech signal recognition server may perform the combining and the implementing of the acoustic model neural network, and the method may further include the terminal performing another combining of the personalization neural network portion and the global neural network portion to again configure the acoustic model neural network, re-training the again configured acoustic model neural network by the terminal to adjust one or more parameters of the personalization neural network portion of the acoustic model neural network to be more accurately trained based on the speech features of the user, and storing the adjusted one or more parameters in the terminal for subsequent speech recognition.

The terminal may performs the combining and the implementing of the acoustic model neural network, and the method may further include the speech signal recognition server performing another combining of the personalization neural network portion and the global neural network portion to again configure the acoustic model neural network, re-training the again configured acoustic model neural network by the speech signal recognition server to adjust one or more parameters of the personalization neural network portion of the acoustic model neural network to be more accurately trained based on the speech features of the user, transmitting the adjusted one or more parameters to the terminal for subsequent speech recognition, and discarding the personalization neural network portion and the adjusted one or more parameters in the speech signal recognition server dependent on the transmission.

The speech signal recognition server may perform the combining and the implementing of the acoustic model neural network, and the method may further include re-training the acoustic model neural network by the speech signal recognition server to adjust one or more parameters of the personalization neural network portion of the acoustic model neural network to be more accurately trained based on the speech features of the user, transmitting the adjusted one or more parameters to the terminal for subsequent speech recognition, and discarding the personalization neural network portion and the adjusted one or more parameters in the speech signal recognition server dependent on the transmission.

The speech signal recognition server may perform the combining and the implementing of the acoustic model neural network, and the speech signal recognition server may perform a combining of a different obtained personalization neural network portion from another device and the obtained global neural network portion to configure a different acoustic model neural network for speech recognition for a different user of the other device, and implements the different acoustic model neural network for the speech recognition for the different user.

In a general aspect, a processor implemented speech signal recognition method includes inputting a speech signal into a personalization layer stored in a terminal in response to reception of the speech signal from a user of the terminal, and obtaining a text signal corresponding to the speech signal based on a provision of an output signal of the personalization layer into which the speech signal is input to a global model, the global model being configured to output respective phonemic signals for respective speech recognitions based on each of output signals from different personalization layers respectively for a plurality of users, where the personalization layer is previously trained based on speech features of the user, and the global model is previously trained on speech features common to the plurality of users.

A combination of implementation of the personalization layer and of implementation of the global model may collectively represent an implementation of a personalized acoustic model trained based on the speech features of the user and the speech features common to the plurality of users, and a combination of implementation of another personalization of another user and another implementation of the global model may collectively represent an implementation of a different personalized acoustic model.

The implementation of the personalized acoustic model may include implementing the personalization layer on a processor of the terminal, the terminal being remote from another computing device including another processor that implements the global model by providing the output signal of the personalization layer, transmitted from the terminal to the other computing device, to the global model.

The other computing device may be configured to generate the text signal through a provision of a result of the implementation of the global model to a language model stored on the other computing device, and the obtaining of the text signal may include receiving the generated text signal from a transmission, from the other computing device to the terminal, of the generated text signal, generated control signals based on the generated text signal, or other information dependent on the generated text signal.

The global model may be stored in a speech signal recognition server, remote from the terminal, configured to obtain text signals for respective speech signals from the plurality of users each based on the output signals from the different personalization layers of corresponding plural terminals of the plurality of users, each different personalization layer being separately trained based on respectively different speech features of different corresponding users.

The method may further include determining whether to use the speech signal to re-train the personalization layer based on the text signal being determined inaccurate.

In one general aspect, a terminal includes a speech signal collector configured to collect a speech signal of a user of the terminal, a memory configured to store a personalization layer trained with speech features of the user, and a processor configured to implement speech recognition of the speech signal of the user using the personalization layer and based on results of an implemented global model, provided an output signal of the personalization layer, that determines a phonemic signal indicating a phoneme included in the speech signal, where the global model is trained with speech features common to a plurality of users, and where the processor is further configured to indicate a result of the recognition or perform a service in response to the result of the recognition, with the result of the speech recognition being dependent on a text signal that is dependent on the determined phonemic signal and corresponding to the speech signal of the user.

The implemented global model may be a remotely implemented global model, implemented in a computing device remote from the terminal.

The processor may be configured to provide the output signal to a speech signal recognition server with respective communication with respective plural terminals of the plurality of users, including the terminal, and configured to store and perform the implementation of the global model, and re-train the personalization layer to generate the output signal based on the speech features of the user, using a back propagation or gradient descent training approach based on the determined phonemic signal resulting from the implementation of the global model by the speech signal recognition server.

The speech signal collector may be configured to selectively store the speech signal based on a determination of an accuracy of the text signal, and the processor may be further configured to obtain the global model from a speech signal recognition server with respective communication with respective plural terminals of the plurality of users, including the terminal, and configured to store the global model, obtain an acoustic model, configured to output the determined phonemic signal from the speech signal, by combining the personalization layer with the obtained global model, and obtain an updated personalization layer having been re-trained based on corresponding speech features of the user, the re-training of the personalization layer including re-training the obtained acoustic model based on the stored speech signal.

The re-training of the obtained acoustic model may be performed using a back propagation or gradient descent training approach, and the obtaining of the updated personalization layer may further include storing parameters of the re-trained obtained acoustic model corresponding to the personalization layer as the updated personalization layer in the memory for use in a subsequent speech recognition by the processor.

The speech signal collector may be configured to selectively store the speech signal based on a determination of an accuracy of the text signal, and the processor may be further configured to transmit the personalization layer and the stored speech signal to a speech signal recognition server with respective communication with respective plural terminals of the plurality of users, including the terminal, and configured to store the global model, and receive an updated personalization layer from the speech signal recognition server, the updated personalization layer having been re-trained by the speech signal recognition server based on corresponding speech features of the user through a re-training of an acoustic model, obtained by the speech signal recognition server through combination of the transmitted personalization layer and the global model, using the transmitted speech signal.

Other features and aspects will be apparent from the following detailed description, the drawings, and the claims.

Figure 1:
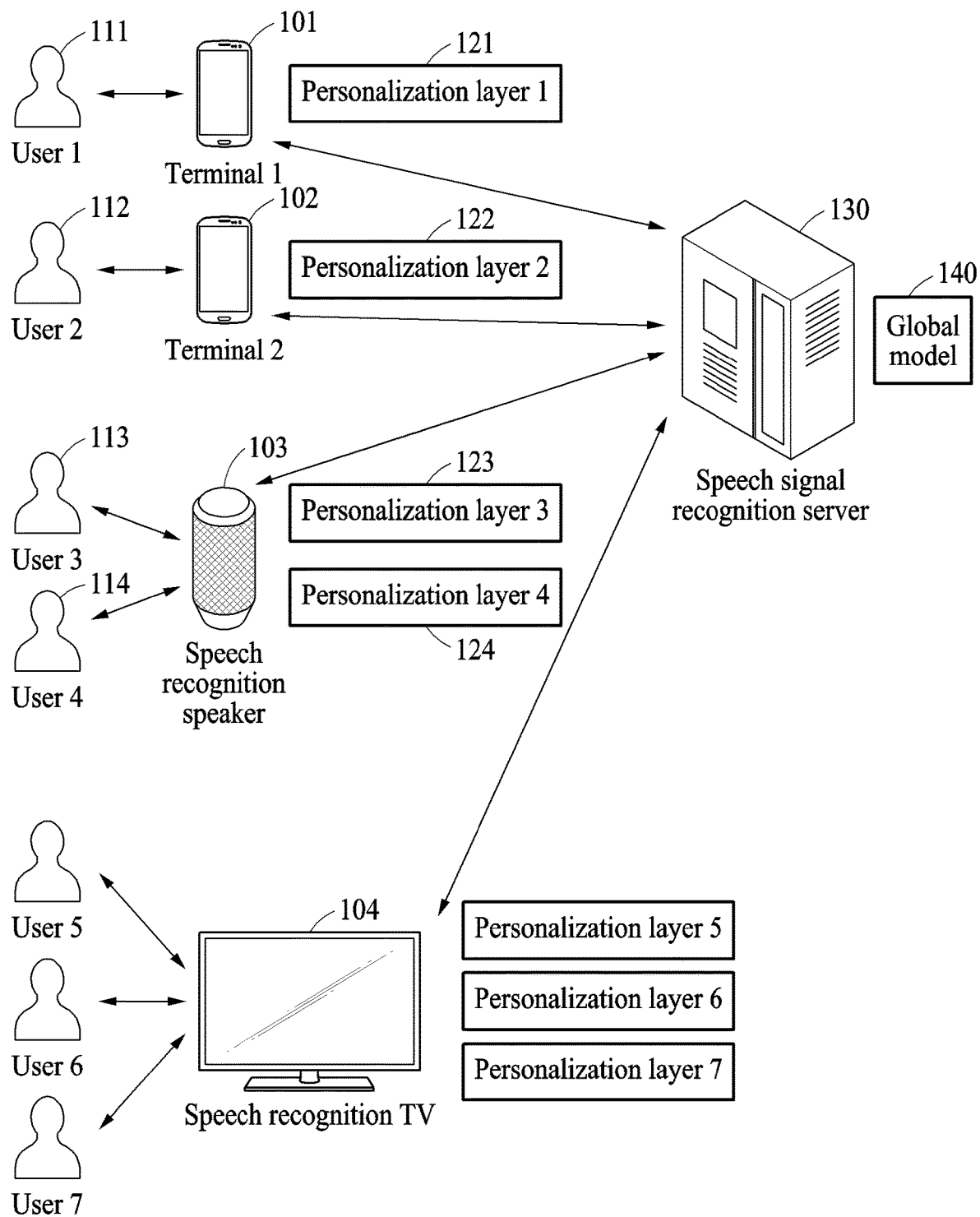
FIG. 1 illustrates an example of a structure of a speech signal recognition system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described in the specification that one component is "connected", "coupled," or "joined" to another component, a third component may be "connected", "coupled," and "joined" between the first and second components, although the first component may be directly connected, coupled, or joined to the second component. In addition, it should be noted that if it is described in the specification that one component is "directly connected, "directly coupled", or "directly joined" to another component, a third component may not be present therebetween. Likewise, expressions, for example, "between" and "immediately between" and "adjacent to" and "immediately adjacent to" may also be construed as described in the foregoing.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof. As further used herein, the term "and/or" includes any and all combinations of one or more of the associated listed items. Expressions such as "at least one of," when preceding a list of elements, modify the entire list of elements and do not modify the individual elements of the list.

Unless otherwise defined herein, all terms used herein including technical or scientific terms have the same meanings as those generally understood by one of ordinary skill in the art to which this disclosure pertains, consistent with and after an understanding of the present disclosure. Terms defined in dictionaries generally used should be construed to have meanings matching with contextual meanings in the related art and the present disclosure and are not to be construed as an ideal or excessively formal meaning unless otherwise defined herein.

Examples set forth hereinafter may be implemented as, and representative of, any of various types of products such as a personal computer, a laptop computer, a tablet computer, a smart phone, a television, a smart home appliance, an intelligent vehicle, a kiosk, and a wearable device, as non-limiting examples. For example, the examples may be, and/or may be applied to or implemented in, a smart phone, a mobile device, or a smart home system to authenticate a user. The examples may include, or be applied to or implemented in, a payment service through user authentication. Further, the examples may include, or be applied to or implemented in, an intelligent vehicle system that automatically starts by authenticating a user. The use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 illustrates an example of a structure of a speech signal recognition system. Referring to FIG. 1, the speech signal recognition system includes one or more devices, for example, a first terminal 101 and a second terminal 102, configured to collect ambient sounds and generate respective speech signals, e.g., as respective digital electrical signals, from the collected ambient sounds. The ambient sounds collected by the first terminal 101 may include sounds generated by a user of the first terminal 101, for example, a first user 111 owning or operating the first terminal 101, while ambient sounds collected by the second terminal 101 may include sounds generated by a user of the second terminal 102, for example, the second user 112 owning or operating the second terminal 102. Each of the devices or terminals included in the speech signal recognition system may be devices that are respectively personalized, e.g., through different personalized feature extractors and/or classifiers, to each of one or more users of the device, through respective personalization layers. Here, though the terminal 101 and terminal 102 are referred to as terminals, it should be understood that the term terminal or device are synonymous. For example, the device or terminal may be a smart phone, a smart pad, a wearable device such as a smart band, a personal digital assistant (PDA), or a laptop computer. Further, the device or terminal may be shared among a plurality of users, such as where the device or terminal is a speech recognition speaker 103 or a speech recognition TV 104, as non-limiting examples.

Recognition of a speech signal refers to automated generation of a digital electrical signal through computational transformation of a captured or stored speech of a user, e.g., in respective frame parsed forms, into another article form that can be further analyzed by the device, for example to control further operations of the device or other devices, such as based on a recognition result in a textual expression form of the speech of the user. For example, through automated and trained configurations, the speech signal recognition system may generate a text signal or information of text corresponding to the speech signal by performing the automated recognition of the speech signal. The speech signal recognition system, for example, includes a speech signal recognition server 130 configured to generate the text signal corresponding to the speech signal, based on respectively provided personalized extracted feature maps or vectors and/or probabilities or classifications, as non-limiting examples, by a corresponding device of the illustrated example distinct personalization layers for each of the illustrated devices and further feature global feature extraction, also as a non-limiting example, and analyses by the speech signal recognition server 130. The speech signal recognition server 130 may then provide a reply signal to the corresponding device that provided the example personalized extracted data and which may have collected the corresponding speech signal of the user for which the recognition is performed. For example, a recognition result text signal generated by the speech signal recognition server 130 may be utilized or further considered to control provision to the user of the corresponding device various services of the corresponding device or of other devices connected to the speech signal recognition server 130 or the corresponding device.

As only an example, when the first user 111 speaks to instruct the first terminal 101 to make a call to the second user 112, the speech signal recognition system may cause a call application of the first terminal 101 to execute based on an analyzing of a recognition result text signal generated through such recognition by the speech signal recognition server 130 of a speech signal including the corresponding captured audible instruction from the first user 111 using the first terminal 101, and thereby control the first terminal 101 to make a call to the second user 112, e.g., depending on the exact instruction, through the executed call application. In addition, based on another speech recognition and resulting generated text signal by the speech recognition system, the speech signal recognition system may provide a service to generate a schedule of the user of a particular device based on the generated recognition result text signal, search for data of a web service based on the recognition result text signal as a determined query, send a text message based on the recognition result text signal, and/or retrieve data stored in the device based on the recognition result text signal as another determined query, as non-limiting examples.

The speech signal recognition system may use an acoustic model and a language model to generate the text signal corresponding to the speech signal. The acoustic model and the language model each refer to respectively trained computational models specially configured to recognize a speech signal based on a Gaussian mixture model (GMM), a deep neural network (DNN), and/or a bidirectional long short term memory (BLSTM), as non-limiting examples. As an example, the acoustic model may be specially configured to recognize a speech signal in a unit of phoneme based on features extracted, for example, from the speech signal, such as based on personalized extracted features and globally extracted features. The speech signal recognition system may further estimate or predict words expressed by the speech signal based on a result of the recognizing of the speech signal obtained by the acoustic model in the example phoneme units. The language model may be specially configured to obtain probability information based on respective connection relations between words. For example, the language model may be specially configured to provide probability information of a subsequent word to follow a current word input into the language model. For example, when a word "this" is input into the language model, the language model may provide probability information suggesting that "is" or "was" is more probable to follow "this" than other words. As another example, the language model may output results as respective probabilities for different words, or as probabilistic results. In this example, the speech signal recognition system may select a highest-probability connection relation between words based on probability information provided by the language model for input words or feature information or states, e.g., depending on the results of the acoustic model, and output a result of the selection as a speech recognition result of a current speech including one or more words for which recognition is being implemented.

The acoustic model and the language model used by the speech signal recognition system each may be respectively specially configured using neural networks, or specially configured as a single neural network, for example. As discussed further below with respect to FIG. 3, each neural network may include a plurality of layers, including an input layer, at least one hidden layer, and an output layer, for example. Nodes of the hidden layer may be referred to as hidden nodes. In an example, respective configurations of the example neural network(s) may be stored in the memory of the speech signal recognition system, such as through respective hyper parameters and trained parameters, e.g., as trained connection weights and/or kernels, which when read from the memory and implemented by one or more processor/processing elements of the speech signal recognition system the neural network(s) are thereby configured. As an example, such connection weights and/or kernels will be referred to as respective parameters of the neural network.

Thus, each neural network may be a neural network that includes a plurality of layers, or may be different portions of a single neural network. Each of the plurality of layers may include a plurality of the aforementioned nodes, which may be respectively defined and configured to perform predetermined activations of activation results from previous layers or of inputs based on the trained parameters for particular defined objectives of the neural network. For example, nodes of hierarchically or laterally neighboring layers may be connected by weighted connections, as an example of the trained parameters. In addition, weighted connections may further include the aforementioned kernels for convolutional layers and/or recurrent connections for recurrent layers. Such weighted connections may be configured between an input layer and a hidden layer, between hidden layers, and/or between a hidden layer and an output layer. As also noted, in recurrent layers such weighted connections may exist between the same layer at different times. Thus, after substantial repetitive adjustments during training of the neural network the corresponding weights of such connections are assigned for the trained objective. The trained parameters may thus be stored in a memory of the speech signal recognition system, such as with a portion of the parameters for the personalized layer(s) of the acoustic model being stored in a particular device or terminal and remaining portions of the parameters for the global model layers of the acoustic model being stored in the speech signal recognition server 130. For example, when the parameters for a personalized layer are acquired or loaded from a memory of a device and then implemented by processor(s)/processing element(s) of the device, and the parameters for the global layers are acquired or loaded from a memory of the speech signal recognition server 130 and then implemented by the speech signal recognition server 130, the device may, as a non-limiting example, be configured to extract personalized features, such as in a feature map or vector form, and the speech signal recognition server 130 may thereby be configured to complete implementation of the acoustic model through input of the extracted personalized features to the configured global model layers of the acoustic model, so the objective of the acoustic model may be achieved to recognize speech captured by the device through a personalized acoustic model without requiring the entirety of the acoustic model to be stored solely on the device or the speech signal recognition server 130. For example, due to the separation of first portions of the acoustic model into personalized layer(s) and global model layer(s), the global model layer(s) can be used for different users while each personalized layer(s) can also be respectively trained in real time or through online training for the distinctiveness of each user, as will be explained in greater detail below.

As noted above, the neural networks of the personalization layer(s) of the acoustic model, the global model layer(s) of the acoustic model, the combination of the personalization layer(s) and the global model layer(s) of the acoustic model, the language model, or any combiner model combining results of the acoustic model and the language model, may include an input layer, at least one hidden layer, and an output layer, each of which include a plurality of nodes. In an example, any of the hidden layers may be a convolutional filter or a fully connected layer in a convolutional neural network (CNN), or various types of filters or other layers based on special functions or features, and/or any of the hidden layers may be recurrent layers or a recurrent neural network (RNN), e.g., as noted above in which an output value of a hidden layer from a previous time is input again into the hidden layer at a current time. In addition, as noted above, any of the neural networks or layers may include LSTM or BLSTM nodes or be LSTM or BLSTM neural networks. Thus, for merely ease of description, neural network examples including a plurality of hidden layers will be referred to below as being a DNN, though any of the other noted configurations are also available, as non-limiting example. Also, herein, training of any such neural networks will be referred to as deep learning.

Thus, as noted above, the speech signal recognition system uses, as the acoustic model, a personalization layer configured based on learned speech features or aspects of a predetermined user and a global model 140 based on learned general speech features or aspects observed for multiple users, e.g., for multiple users using the speech signal recognition system. In an example, the acoustic model may initially be trained using training data for multiple training users, for example, and then as explained further below the global model layers may again be trained for multiple users and/or one or more of the personalization layer(s) for different users or devices may be respectively updated or further trained to respectively personalize each personalization layer(s) for each corresponding users. The trained personalization layer may be stored in the device collecting the speech signal in the speech signal recognition system, such as through the storage of the corresponding parameters of the particular personalization layer. Thus, such trained personalization layers will be referred to below as personalization layers configured to learn speech features or aspects of a particular user. When the personalization layer is stored in the device collecting the speech signal in the speech signal recognition system, the speech signal recognition server 130 may not store that personalization layer, nor the personalization layers for other subscribers of other devices of the speech signal recognition system, but rather may merely store the parameters for configuring the global model layers of the acoustic model. Thus, costs for storing the personalization layers of all the subscribers of the speech signal recognition system in the speech signal recognition server 130 may be reduced compared to previous approaches where each of multiple separate fully personalized acoustic models for each user would have to be stored by a server and then the server would have to separately implement each of the different acoustic models depending on which device is requesting speech recognition.

Referring to FIG. 1, the first terminal 101 includes a first personalization layer 121 configured to learn speech features or aspects of the first user 111. The second terminal 102 includes a second personalization layer 122 configured to learn speech features or aspects of the second user 112. The device shared among the plurality of users, for example, the speech recognition speaker 103 or the speech recognition TV 104, includes respective personalization layers of the plurality of users using the device. For example, the speech recognition speaker 103 includes a third personalization layer 123 and a fourth personalization layer 124 respectively corresponding to a third user 113 and a fourth user 114 using the speech recognition speaker 103. Likewise, the speech recognition TV 104 includes fifth, sixth, and seventh personalization layers.

Using respective personalization layers having learned speech features or aspects of each subscriber, as reflected in the respective trained parameters of each personalized layer, the speech signal recognition system prevents a decrease in the performance of recognizing speech signals of some of the subscribers over other subscribers. For example, the speech signal recognition system achieves the prevention without incurring the costs mandated by previous approaches to store separate full acoustic models personalized for each of all the subscribers of the speech signal recognition system in the speech signal recognition server 130.

Figure 2:
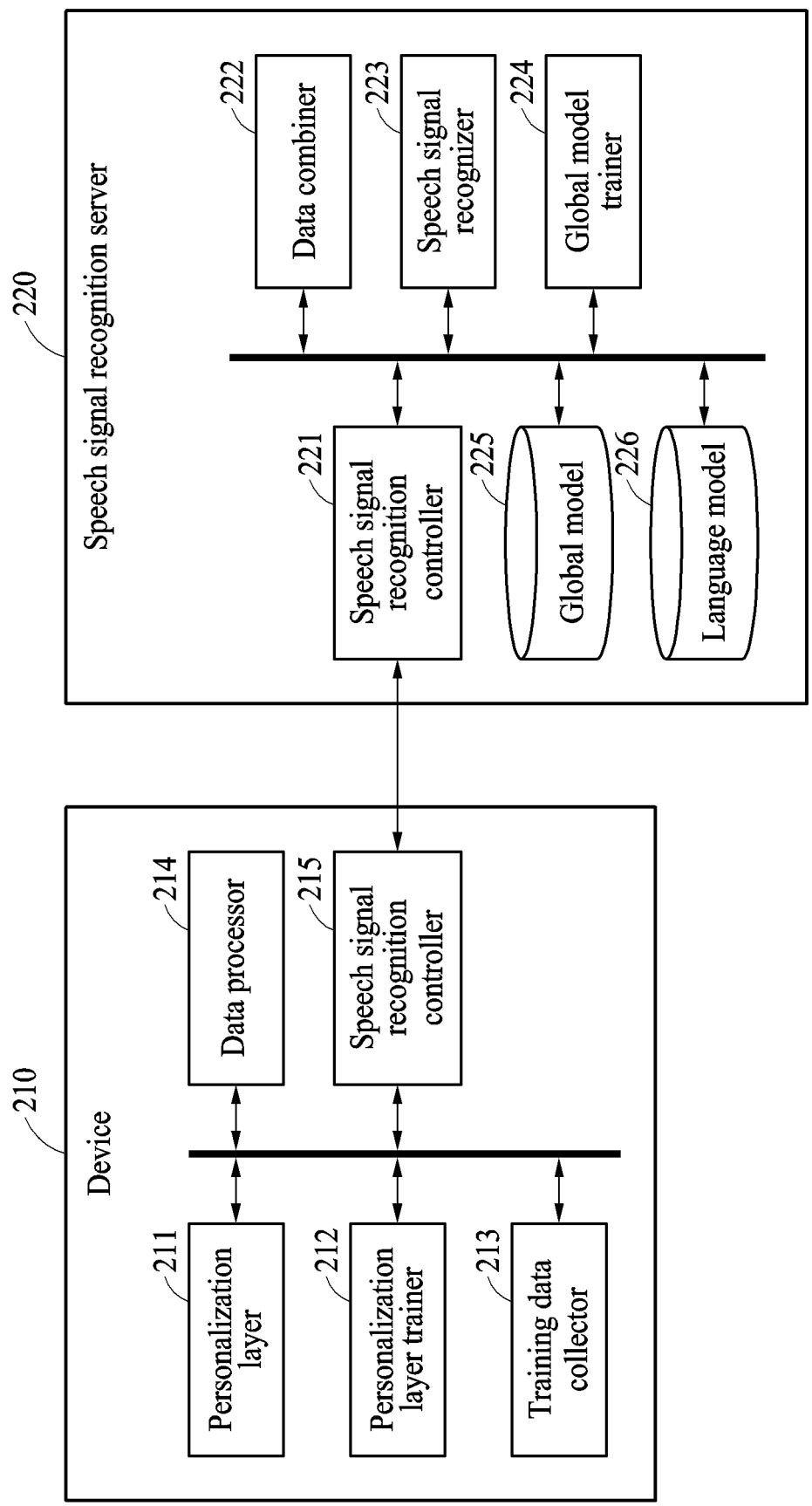
FIG. 2 is a block diagram illustrating an example of structures of a device and a speech signal recognition server of a speech signal recognition system.

Hereinafter, a method of recognizing a speech signal using a personalization layer having learned speech features or aspects, as reflected in the trained parameters of the personalization layer or as reflected in the training or updating of the parameters of the personalization layer, for example, of each subscriber in the speech signal recognition system will be described in greater detail. FIG. 2 is a block diagram illustrating an example of structures of a device 210 and a speech signal recognition server 220 of a speech signal recognition system.

As non-limiting examples, a user of the device 210 activates a speech signal recognition function of the device 210 by controlling an application, a user interface, or a switch provided to the user through the device 210. For example, the device 210 may include a physical button that is activated when the user presses with an intensity greater than or equal to a predetermined strength, or may include a soft key on a display of the device 210 that is activated when the user touches the soft key on the display. For example, the user may activate or implement the speech signal recognition operation of the device 210 by pressing the button or touching the soft key. In a case in which the device 210 includes the display, for example, a touch screen configured to sense such a touch input of the user, the user may activate or implement the speech signal recognition operation of the device 210 by clicking or touching an icon displayed on the display. Alternatively, the user may activate or implement the speech signal recognition operation through oral command, or through any other non-limiting way the device is configured to initiate implementation of commands or operations including background operation of the speech recognition operations herein to monitor for such commands or speech recognition operation activations.

Referring to FIG. 2, the device 210 includes a speech signal recognition controller 215 configured to control elements of the device 210 to recognize a speech signal of the user. For example, the speech signal recognition controller 215 may output a displayed interface indicating that the device 210 is prepared for an input of a speech signal, or that the device 210 is waiting for the input of the speech. Such outputs or indications may be made to the user as a feedback on the control of the user. The user may then speak a function to be performed through the device 210 or an inquiry for data to be obtained from the device 210, in response to the output interface. A sound wave generated as the user speaks is changed to a speech signal by a microphone of the device 210.

The device 210 further includes a data processor 214 configured to preprocess the speech signal, input the preprocessed speech signal into a personalization layer 211, and transmit an output signal of the personalization layer 211 to the speech signal recognition controller 215. While preprocessing the speech signal, the data processor 214 may parse the speech signal from the microphone, obtains a spectrogram from the speech signal based on the parsing, and extract corresponding frequency features of the speech signal from the spectrogram. The data processor 214 may obtain the spectrogram with respect to the speech signal by performing a Fourier transform on the speech signal, for example. The data processor 214 generates a spectrum with respect to the speech signal, e.g., for a parsed portion of the speech signal, by calculating a fundamental frequency of the speech signal through the Fourier transform, calculating an amplitude value of a frequency corresponding to a natural number multiple (1, 2, 3 . . . ) of the fundamental frequency, e.g., with the frequency value corresponding to an x-axis and the amplitude value corresponding to a y-axis of the spectrogram. For example, the spectrogram continuously represents a magnitude of an amplitude value for each frequency position by increasing a size of a bin as the amplitude value in the generated spectrum increases, and decreasing the size of the bin as the amplitude value in the generated spectrum decreases. The data processor 214 may thus extract respective frequency feature information shown in the spectrogram as features of the speech signal.

The data processor 214 inputs the extracted features of the speech signal, e.g., the spectrogram, or the speech signal into the personalization layer 211. For example, the speech signal or extracted features of the speech signal may be input in frame units, frame window units, or overlapping frame window units. The device 210 generates the personalization layer 211 using the stored parameters of the personalization layer 211 stored in a memory. The personalization layer 211 may include an input layer, at least one hidden layer, and an output layer, for example. Thus, for example, the parameters of the personalization layer 211 may include respective parameters of the at least one hidden layer, e.g., as connection weights between the input layer and a hidden layer, between hidden layers, and/or between a hidden layer and the example output layer. The parameters may also include respective kernels for different filters of any of the one or more hidden layers, respective bias weights, and/or recurrent connection weights of any of the hidden layers. As also noted above, such parameters may further include LSTM and/or BLSTM parameters. In some examples the personalization layer 211 may be only one or more hidden layers of the overall acoustic model, e.g., without input and output layers.

In the case in which the personalization layer 211 includes an input layer, at least one hidden layer, and an output layer, the data processor 214 inputs the extracted feature of the speech signal, e.g., the spectrogram, or the speech signal into the input layer of the personalization layer 211. Then, due to the specially trained parameters of the personalization layer 211, the data processor 214 may obtain an output signal output from the personalization layer 211, for example, as values or states of nodes of the output layer of the personalization layer 211. The output of the output layer may also be a feature map or feature vector of personalized extracted features and/or probabilistic or classification information for speech features or aspects of the particular user for which the personalization layer 211 is trained, e.g., as intermediary feature, probabilistic, and/or classification information of the acoustic model made up of the personalization layer 211 and the global model 225 that is implemented by the speech signal recognition server 220. The data processor 214 transmits the output signal obtained from the personalization layer 211 to the speech signal recognition controller 215.

The speech signal recognition controller 215 transmits the output signal of the personalization layer 211 to the speech signal recognition server 220 through a wired or wireless network connecting the device 210 and the speech signal recognition server 220. The speech signal recognition server 220 includes a speech signal recognition controller 221 configured to control elements of the speech signal recognition server 220 to recognize a speech signal of the user of the device 210.

Thus, in the example of FIG. 2, the speech signal recognition controller 221 receives the output signal of the personalization layer 211 from the device 210. The speech signal recognition server 220 further includes a data combiner 222 configured to input the output signal of the personalization layer 211 into the global model 225 of the speech signal recognition server 220, e.g., with the personalization layer 211 of the device 210 and the global model 225 of the speech signal recognition server 220 in combination representing the acoustic model. Thus, the speech signal recognition controller 221 transmits the received output signal of the personalization layer 211 to the data combiner 222.

The speech signal recognition server 220 generates the global model 225 using trained parameters of the global model 225 stored in a memory. For example, the global model 225 may be implemented through an example configured neural network generated through corresponding trained parameters for the global model 225. The global model 225 may, thus, include an input layer, at least one hidden layer, and an output layer. The data combiner 222 may input the output signal of the personalization layer 211 into the input layer of the global model 225. Then, due to the specially trained parameters of the global model 225, the global model 225 outputs a probability of the speech signal matching each phoneme included in a preset phoneme set, in a form of a probability vector, from the output signal of the personalization layer 211. The probability vector output from the global model 225 will be referred to as a phonemic signal.

The speech signal recognition server 220 further includes a speech signal recognizer 223 configured to generate a text signal by recognizing the speech signal of the user of the device 210 using the global model 225 and a language model 226. The speech signal recognizer 223 obtains the phonemic signal from the output layer of the global model 225. The speech signal recognizer 223 inputs the obtained phonemic signal into the language model 226. For example, the speech signal recognition server 220 may generate the language model 226 using trained parameters of the language model stored in the memory. In an example, the language model 226 is implemented through a neural network and the trained parameters are of the neural network. For example, the language model 226 may include an input layer, at least one hidden layer, and an output layer. When the speech signal recognizer 223 inputs the obtained phonemic signal into the input layer of the language model 226, and due to the specially trained parameters of the language model 226, the language model 226 outputs a word or a sentence included in the speech signal based on the phonemic signal.

In detail, the speech signal recognizer 223 obtains, from the output layer of the language model 226, information indicating a probability of a word or a sentence included in the speech signal. The speech signal recognizer 223 may then generate the text signal corresponding to the recognized speech signal from the obtained information, e.g., such as representing a transcription of the recognized speech signal. The generated text signal may be transmitted to the device 210 through the speech signal recognition controller 221. The speech signal recognition controller 215 of the device 210 then controls the device 210 based on the received text signal. While explained through the transcription of the recognized speech into text form, the speech signal recognizer 223 may otherwise provide information providing alternative indications of the recognized speech and/or indications of what operations or instructions are be implemented by the device 210 based on the recognized speech, as non-limiting examples.

In the example of recognizing the speech signal obtained from the user of the device 210, the speech signal recognition system may also further train the personalization layer 211, the global model 225, and/or the language model 226 based on a result of the recognizing the speech signal. In particular, such training may be performed simultaneously or in real-time with the operation of recognizing the speech signal, also referred to herein as online learning.

For example, speech signal recognition server 220 may further include a global model trainer 224 configured to determine whether to train the global model 225 and/or the personalization layer 211 of the device 210 based on the phonemic signal of the global model 225. The global model trainer 224 calculates a confidence with respect to the result of recognizing of the speech signal based on the phonemic signal and/or the resulting text signal that is, or is to be, transmitted to the device 210. The global model trainer 224 may determine whether to utilize the result of the recognizing of the speech signal to further train the global model 225 and/or the personalization layer 211 of the device 210 based on the calculated confidence. For example, in a case in which the confidence fails to meet, e.g., is less than or equal to, a preset confidence threshold, the global model trainer 224 may determine or select to train the acoustic model, including training of the global model 225 and/or the personalization layer 211 of the device 210, based on the speech signal.

When further training the global model 225, the global model trainer 224 may use the speech signal to train the global model 225 with respect to speech features or aspects determined or predetermined common to the user of the device 210 and users of all devices connected to the speech signal recognition server 220. The global model trainer 224 may train the global model 225 using back propagation or gradient descent training approaches, such as in a direction from an output layer of the global model 225 through a first hidden layer or input layer of the global model 225. For example, the global model trainer 224 determines a value to be input into the output layer of the global model 225 to perform back propagation based on the phonemic signal or the text signal transmitted to the device 210. In another example, the global model trainer 224 changes weights for nodes included in the global model 225 based on the phonemic signal or the text signal transmitted to the device 210 through such back propagation or gradient descent.

In further training of the acoustic model, the global model trainer 224 may transmit final or interim training results of the global model 225 to the device 210, such as in further back propagation or gradient descent adjustments made from a first hidden layer or the input layer of the global model 225 toward the output layer of the personalization layer 211. In training the personalization layer 211 of the device 210, the global model trainer 224 transmits information to be used to train the personalization layer 211 to the device 210 for completing the training of the acoustic model for the example back propagation or gradient descent processes, such as for completing the back propagation or gradient decent process from the global model 225 portions of the acoustic model through the personalization layer 211 portions of the acoustic model. For example, the global model trainer 224 transmits a result of performing back propagation on the global model 225 or a gradient descent value obtained by performing gradient descent to the device 210 through the speech signal recognition controller 221.

The device 210 further includes a personalization layer trainer 212 configured to train the personalization layer 211. The speech signal recognition controller 215 transmits the information to be used to train the personalization layer 211 to the personalization layer trainer 212. The speech signal obtained from the particular user of the device 210 may be exclusively used to train the personalization layer 211 of the device 210 for the particular user. Thus, parameters, e.g., connection weights or kernels, corresponding to nodes included in the personalization layer 211 are changed or adjusted during the training based on the speech features or aspects of the user of the device 210. Thus, as noted above, the process of training the global model 225 portion of the acoustic model may be based on speech of various speakers, while the training of the personalization layer 211 portion of the acoustic model is based on the speech of the particular user.

For example, the speech signal recognition system collects speech signals from the user of the device 210, and trains the personalization layer 211 based on the plurality of collected speech signals. The device 210 further includes a training data collector 213 configured to collect speech signals of the user. For example, the speech signals may be collected over a period of time from different speech recognition operations. The training data collector 213 selects a speech signal determined suitable for being used to train the personalization layer 211 from the speech signals of the user of the device 210 and stores the selected speech signal. The speech signal determined suitable for being used to train the personalization layer 211 may include a sentence for which speech recognition is determined to have been performed incorrectly, such as based on feedback from the user of the incorrectness of a recognition result of a corresponding speech.

For example, to determine whether speech recognition has been performed correctly, the device 210 or the speech signal recognition controller 215 may output a result of the speech recognition by the acoustic model to the user of the device 210, and receive a feedback from the user. For example, the speech signal recognition system may generate a recognition result text signal from a recognizing of a sentence A, for example, "Let me know the weather in Thailand tomorrow" spoken in the speech signal, but the generated recognition result text signal may indicate that the sentence A is recognized as, for example, "Let me know the weather in Taiwan tomorrow", which is different from the sentence A. The device 210 or the speech signal recognition controller 215 may output, to the user, a feedback interface, for example, "Do you want me to search for the weather in Taiwan tomorrow?", which inherently indicates that an operation related to the recognition result text signal is thereby being or going to be performed based on the recognition result text signal. However, the user may indicate that the recognition result text signal is incorrect through the feedback interface, for example, when the user touches a cancel button with respect to the output inquiry by the device 210, the device 210 or the speech signal recognition controller 215 then instructs the training data collector 213 to collect the corresponding speech signal as an example of a speech signal for which the recognition result text was incorrectly generated by the acoustic model.

When collecting the speech signal recognized incorrectly, the training data collector 213 may inquire and receive a correct text signal corresponding to the collected speech signal from the user, or may inquire and receive the correct text signal when determining to, or beginning, the training of the personalization layer 211. In an example, in a case in which speech recognition has been performed incorrectly, the user may speak the sentence A again while or after indicating to the device 210, e.g., through feedback interface, that the recognition result text signal was incorrect. As another example, when a speech signal similar to the collected speech signal is determined captured twice in sequence, the training data collector 213 may determine the second utterance to be such an incorrect recognition feedback provided by the user with respect to an immediately previous recognition result text signal generated from the speech signal input. Alternatively, the training data collector 213 may assume that when the user speaks the sentence A again to the device 210, the speech signal recognition system has recognized the sentence A correctly. In this example, the user provides a positive feedback on the correctly recognized sentence A through the feedback interface. The training data collector 213 may thus match and store speech signals recognized incorrectly for which the user provides negative feedback, as well as the recognition result text signal for which the user provides positive feedback.

In a situation determined by the device 210 suitable for training the personalization layer 211, such as in a situation in which the user of the device 210 is determined to not be using or interacting with the device 210, and where the device 210 is determined able to communicate with the speech signal recognition server 220, e.g., in real time, the speech signal recognition controller 215 may utilize the speech signal collected by the training data collector 213 to train the personalization layer 211. For example, the speech signal recognition controller 215 may input the speech signal collected by the training data collector 213 into the personalization layer 211 while the device 210 is being charged, while the device 210 is connected to a desktop computer, or when an available resource, for example, a memory capacity, of the device 210 is determined sufficiently secured, or the device 210 is determined able to communicate with the speech signal recognition server 220, such as when the device 210 is connected to a wireless-fidelity access point (Wi-Fi AP) that can communicate with the speech signal recognition server 220. For example, the speech signal recognition controller 215 preprocesses the collected speech signal through the data processor 214, and inputs the preprocessed speech signal into the personalization layer 211. Alternatively, the collected speech signal may be stored in the preprocessed speech signal form. While transmitting an output signal of the personalization layer 211 to the speech signal recognition server 220, the speech signal recognition controller 215 requests the speech signal recognition server 220 to transmit information to be used to train the personalization layer 211.

The speech signal recognition server 220 recognizes the speech signal by inputting the output signal of the personalization layer 211 into the global model 225, and generates information to be used to train the personalization layer 211 based on a result of recognizing the speech signal. As noted above, the generated information may include information to be used to change the weights for the nodes included in the personalization layer 211, for example, such as through values to be used to perform or continue back propagation or gradient descent values for the acoustic model including the global model 225 and personalization layer 211. As noted, the generated information is used by the device 210, or more particularly, by the personalization layer trainer 212 to train the personalization layer 211.

As described above, when the device 210 distributed to the users of the speech signal recognition system store respective personalization layers 211 trained based on speech features or aspects of each user of the device 210, the speech signal recognition server 220 recognizes corresponding speech signals in view of speech features or aspects of each user, e.g., without the need or requirement to store personalized acoustic models for each the users in the speech signal recognition server 220 or in the device 210. Therefore, the speech signal recognition system provides an accurate speech recognition service while reducing costs for storing the personalization layers 211, or such respective personalized acoustic models, in the speech signal recognition server 220 and distributes processing resources for implementing such personalized acoustic models between the speech signal recognition server 220 and each of plural devices using an example single global model in the speech signal recognition server 220. Furthermore, since the speech signal recognition server 220 is not required to store an individual speech features or aspects of each user, for example, the global model 225 or the language model 226 may only need to be trained or learn speech features or aspects common to multiple users, rather than being required to be trained in view of many various speech features or aspects of many different users, the speech signal recognition system according to one or more examples may provide more accurate and personalized speech recognition service, in a distributed manner, while also achieving privacy protection.

Figure 3:
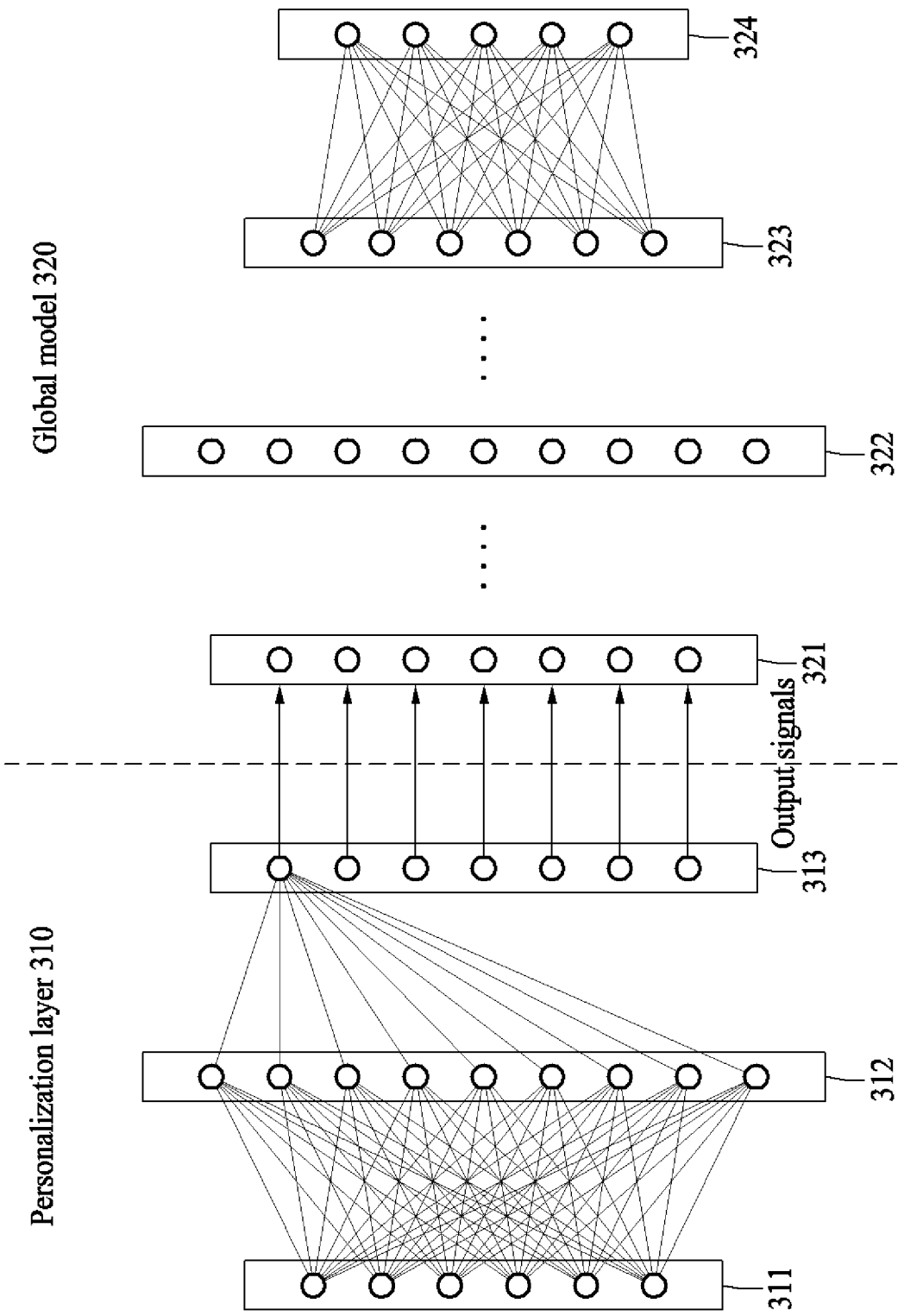
FIG. 3 illustrates an example of a neural network based model used by a speech signal recognition system to recognize a speech signal.

FIG. 3 illustrates a graphical example of the neural network used by the speech signal recognition system to recognize a speech signal. Referring to FIG. 3, the speech signal recognition system recognizes a speech signal using a personalization layer 310 configured to learn speech features or aspects of a particular user, and global model 320 configured to learn speech features or aspects common to a plurality of users. The personalization layer 310 and the global model 320 may each be neural networks or portions of the same neural network, and collectively represent the acoustic model for the particular user. For example, the personalization layer 310 may be a neural network, or a portion of the acoustic model neural network, that includes an input layer 311, at least one hidden layer 312, and an output layer 313, or may merely include one or more such hidden layers 312 in some examples. The global model 320 may be a neural network, or another portion of the acoustic model neural network, that includes an input layer 321, one or more of such illustrated hidden layers 322 and 323, and an output layer 324. The speech signal recognition system stores the personalization layer 310 and the global model 320 in a device of a user and a speech signal recognition server, respectively. The personalization layer 310 is stored in the device of the user to learn unique speech features or aspects of the user, while the global model 320 learns speech features or aspects common to multiple or all users connected to the speech signal recognition server.

Each layer of the personalization layer 310 and the global model 320 may include filter or classification nodes configured to extract features or classify a speech signal or activation results from a previous layer. Filter or classification nodes of one layer may thus be connected to filter or classification nodes of an adjacent layer through an edge, where the aforementioned connection weights are reflected. In an example, a speech signal of the user received by the device may be input into the input layer 311 of the personalization layer 310, and with forward computations from the input layer 311 toward the output layer 313 through the trained parameters of the personalization layer 310 being performed with respect to the speech signal input into the input layer 311, the output layer 313 outputs result values of the forward computation performed by the personalization layer 310 with respect to the speech signal. For example, the output may include feature vectors or maps of extracted features or probabilistic and/or classification information or values with respect to the speech signal. In an example, such result values may also be considered intermediary values of personalized internal hidden layers of the overall acoustic model neural network.

Thus, such result values from the output layer 313 may be transmitted to the global model 320 of the speech signal recognition server as an output signal. The output signal is input into the input layer 321 of the global model 320. The global model 320 performs forward computation with respect to the output signal through the trained parameters of the global model 320, and the output layer 324 outputs a recognition result value of the acoustic model. For example, as a recognition result value, the speech signal recognition server determines a phoneme probability vector as a phonemic signal corresponding to the speech signal from the output layer 324. The phoneme probability vector may be input into a language model and utilized to generate a text signal corresponding to the speech signal as a recognition result of the speech signal.

To provide a speech recognition service to the user generating the speech signal, the generated text signal may further be used to generate a control signal to control the device in which the personalization layer 310 is stored or the speech signal recognition server, such as another example of an indication of a result of the speech recognition of the speech signal. The device may also request the user to confirm the service to be implemented corresponding to the control signal before executing the generated control signal to implement the service. In such an example, when the user instructs the device to not execute the service, the device may infer the speech recognition of the speech signal was inaccurate and may store the speech signal for use in further training of the personalization layer 310.

Figure 4:
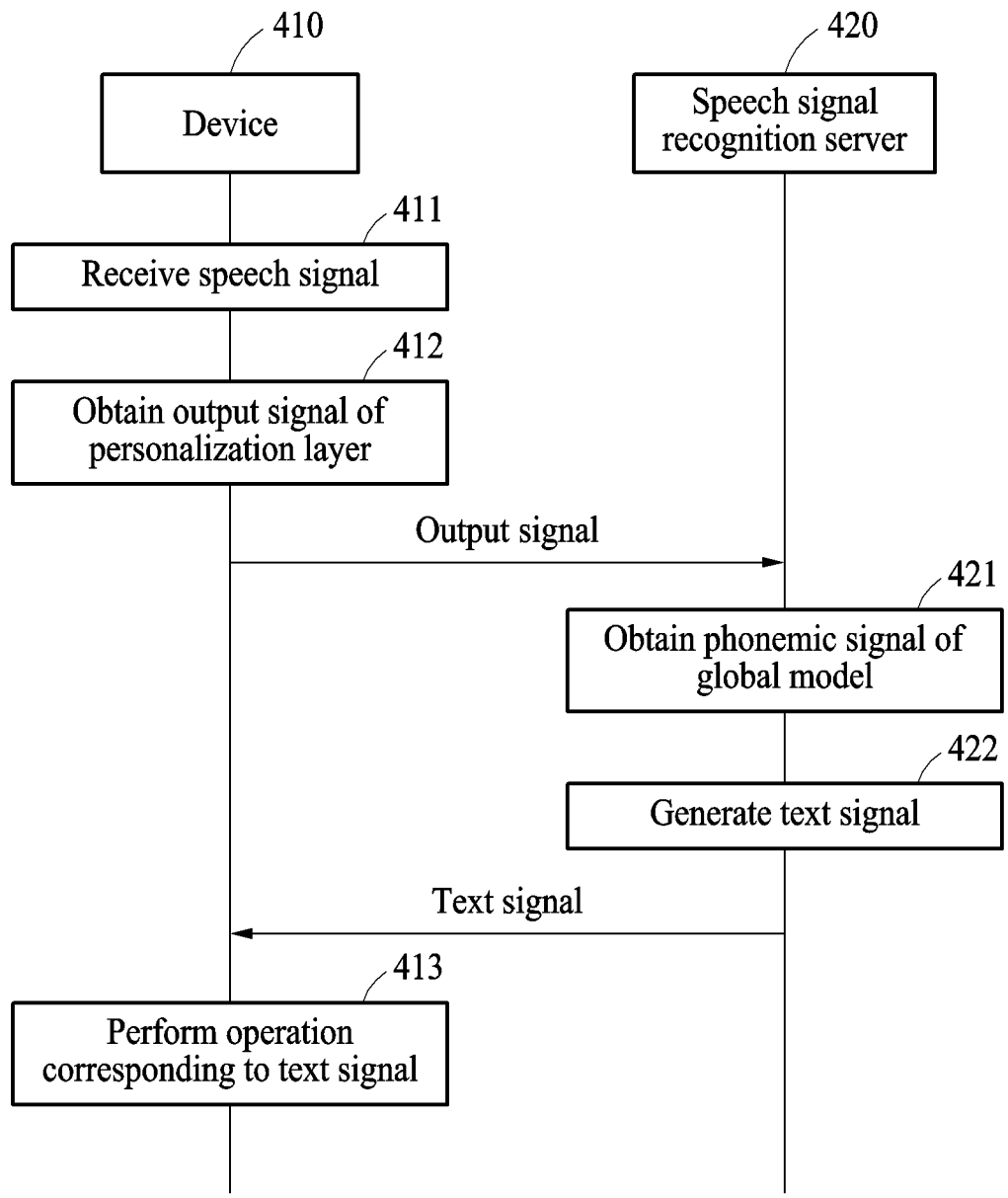
FIG. 4 is a flowchart illustrating an example of recognizing a speech signal in a device and a speech signal recognition server of a speech signal recognition system.

FIG. 4 is a flowchart illustrating an example of recognizing a speech signal in a device 410 and a speech signal recognition server 420 of a speech signal recognition system.

Referring to FIG. 4, in operation 411, the device 410 receives a speech signal from a user. The speech signal includes information related to a sound wave generated when the user speaks an operation to be performed through the device 410 or a speech signal recognition service.

In operation 412, the device 410 obtains an output signal of a personalization layer corresponding to the speech signal by inputting the received speech signal into the personalization layer of an acoustic model. The device 410 stores trained parameters, to configure the personalization layer, in a memory of the device 410. One or more processors of the device 410 are configured to obtain the trained parameters and thereby configured with the personalization layer, e.g., including the trained neural network particularly trained based on previous speech features or aspects of the user. The device 410 inputs the speech signal or information obtained by preprocessing the speech signal into an input layer of the personalization layer. The device 410 obtains the output signal corresponding to the speech signal through an output layer of the personalization layer. The device 410 transmits the obtained output signal to the speech signal recognition server 420.

In operation 421, the speech signal recognition server 420 obtains a phonemic signal corresponding to the speech signal from a global model of the acoustic model by inputting the output signal received from the device 410 into the global model as configured by one or more processors of the speech signal recognition server 420 through obtained trained parameters of the global model, e.g., as stored in a memory of the speech signal recognition server 420. The global model is a model having learned speech features or aspects common to a plurality of users, and trained to generate phonemic signals indicating probabilities of phonemes that may be included in the speech signal in response to the output signal from the device 410. The speech signal recognition server 420 obtains the phonemic signal from, or as, value(s) of an output layer of the global model.

In operation 422, the speech signal recognition server 420 generates a text signal corresponding to the speech signal from the obtained phonemic signal, such as through a language model provided one or more of such respectively obtained phonemic signals. For example, the speech signal recognition server 420 identifies a sentence or a word included in the speech signal by inputting such respectively obtained phonemic signal(s) into the language model, and an output of the language model providing indication of the identified sentence or word. Thus, the text signal includes a result of identifying the sentence or the word included in the speech signal. The speech signal recognition server 420 transmits the text signal to the device 410.

In operation 413, the device 410 performs an operation corresponding to the text signal. That is, the device 410 performs an operation or service corresponding to the recognized speech uttered by the user to the device 410. In detail, the device 410 generates a control signal to control the device 410 to perform such a predetermined operation or service from the text signal. In another example, the control signal is generated by the speech signal recognition server 420. The device 410 may also output, to the user, an interface enabling the user to verify whether the recognized speech or corresponding service or operation, to be implemented in response to the control signal, accords with the speech of the user. When the user verifies that the recognized speech or corresponding service or operation accords with the speech of the user, the device 410 implements the control signal and causes the operation or service corresponding to the control signal to be executed. When the user verifies that the recognized speech or corresponding service or operation does not accord with the speech of the user, the device 410 suspends the implementation of the control signal, and thus does not execute the corresponding service or operation, and stores the speech signal for subsequent training of the personalization layer.

Figure 5:
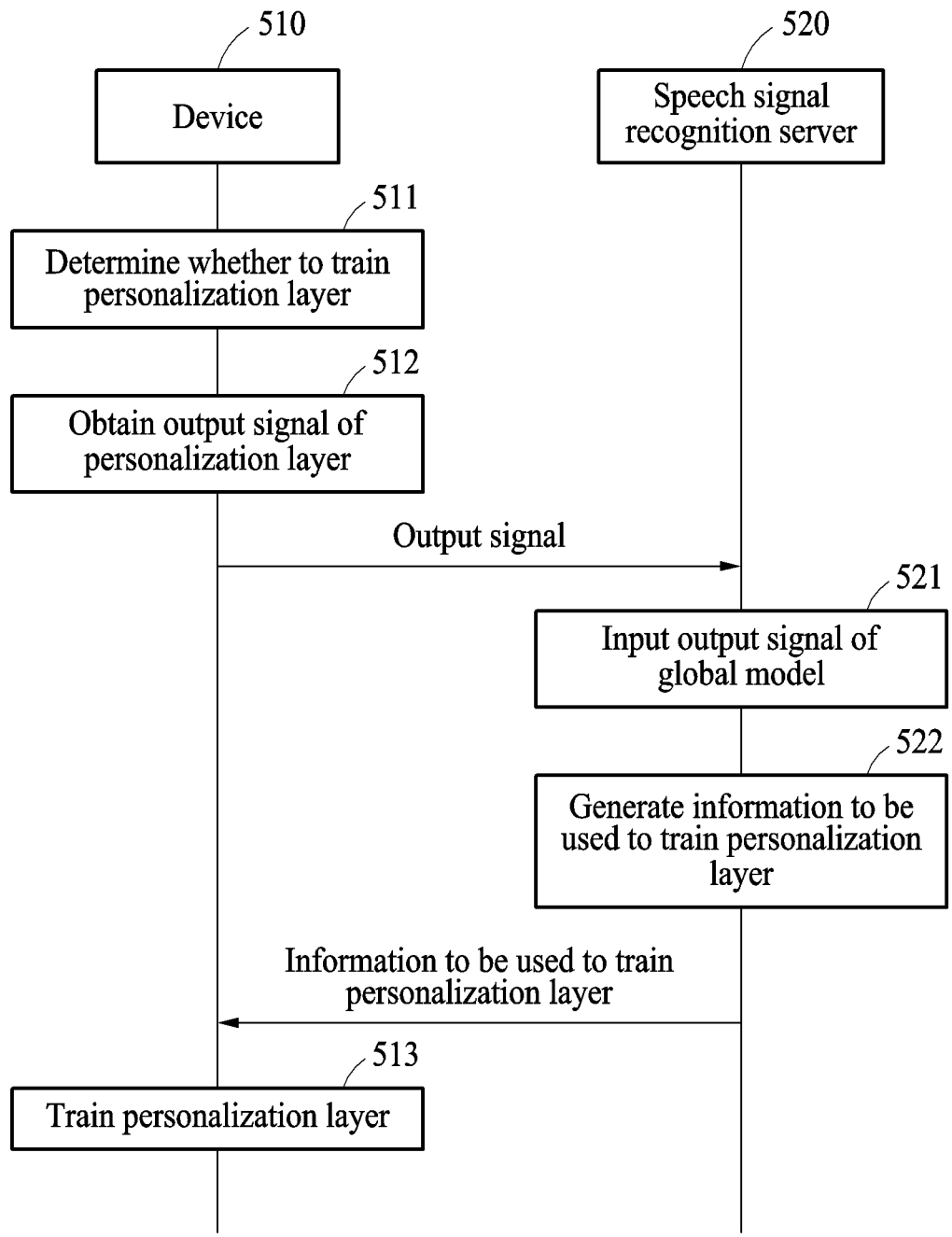
FIG. 5 is a flowchart illustrating an example of training a personalization layer in a device and a speech signal recognition server of a speech signal recognition system.

FIG. 5 is a flowchart illustrating an example of training a personalization layer in a device 510 and a speech signal recognition server 520 of a speech signal recognition system.

Referring to FIG. 5, in operation 511, the device 510 determines whether to train a personalization layer, e.g., in view of a state of the device 510 and/or the speech signal recognition server 520. The states of the device 510 or the speech signal recognition server 520 that are considered by the device 510 includes a network connection state between the device 510 and the speech signal recognition server 520, a memory capacity of the device 510 and/or the speech signal recognition server 520, as well as other factors. For example, when the device 510 determines that the speech signal recognition server 520 is currently enabled to receive a transmission of an output signal of the personalization layer to the speech signal recognition server 520 or to receive collected speech signals by the device 510, and the device 510 is enabled to receive information to be used to train the personalization layer from the speech signal recognition server 520, the device 510 may initiate training of the personalization layer. Such a determination of whether the speech signal recognition server is currently enabled to receive such information or whether the device 510 is enabled to receive training information from the speech signal recognition server 520 may be made based on a communication or electronic handshake between the device 510 and speech signal recognition server 520, as a non-limiting example. Such a determination may alternatively be made by the device 510 merely when the device 510 determines that the device 510 has wired or wireless access.

When the device 510 determines to train the personalization layer, the device 510 may obtain an output signal of the personalization layer corresponding to a speech signal collected by the device 510 to train the personalization layer, e.g., by inputting the collected speech signal into the personalization layer, in operation 512. The device 510 may then transmit the obtained output signal to the speech signal recognition server 520.

In operation 521, the speech signal recognition server 520 inputs the output signal provided from the device 510 into a global model of the acoustic model represented by the combination of the personalization layer and the global model. The global model outputs a phonemic signal, e.g., including a result of identifying a phoneme included in the speech signal from the output signal. As described above, the phonemic signal may include a phoneme probability vector indicating a probability of the phoneme included in the speech signal matching a preset phoneme.

In operation 522, the speech signal recognition server 520 generates information to be used to train the personalization layer based on the phonemic signal or a result of recognizing the speech signal from the phonemic signal. The information to be used to train the personalization layer may include a gradient descent value to be used to change or adjust parameters of the personalization layer for an improved accuracy of speech recognition when the output of the personalization layer is input to, and further considered by, the global model of the speech signal recognition server 520. For example, the speech signal recognition server 520 may calculate an accuracy of recognizing the speech signal, and determine whether or how to train the personalization layer based on the calculated accuracy. The information to be used to train the personalization layer may be generated only when the personalization layer is determined to be trained. As the adjustments are with respect to parameters of the personalization layer, information to be used to train the personalization layer thereby represents information related to speech features or aspects of the user of the device 510 extracted from the collected speech signal. The speech signal recognition server 520 transmits the information to be used to train the personalization layer to the device 510.

In operation 513, the device 510 trains the personalization layer based on the received information to be used to train the personalization layer. For example, the device 510 changes or adjusts connection weights between nodes in different layers of the personalization layer and/or kernel weights within filtering layers of the personalization layer, based on the gradient decent value included in the received information. Thus, based on this received information, the device 510 can thereby re-train the personalization layer based on the collected speech signal, further train the personalization layer additionally, or merely perform fine tuning of the parameters of the personalization layer.

Above is described an example in which the personalization layer configured to learn a personal speech features or aspects of a user is stored in the device 510. In an example, the personalization layer is not provided to an external device such as the speech signal recognition server 520, but rather always only maintained in one or more of the devices, noting that in different devices for the same user the same personalization layer may be stored in the respective different devices. In another example, the personalization layer stored in the device 510 may be transmitted to the speech signal recognition server 520 for training, through combination of the personalization layer with the global model at the speech signal recognition server 520, where the entire acoustic model for the corresponding user can be trained by the speech signal recognition server 520. In still another example, the device 510 may receive the global model from the speech signal recognition server 520, and combines the personalization layer with the global model for training of the corresponding entire acoustic model for the corresponding user by the device 510. For example, with these latter examples, with respective entire user specific acoustic models being implemented on one computing device, the training of the personalization layer may be more rapidly performed, after which the trained personalization layer may be transmitted back to the device 510 and discarded at the speech signal recognition server 520 in the former example or the global model may be discarded from the device 510 after the training of the personalization layer in the latter example.

Figure 6:
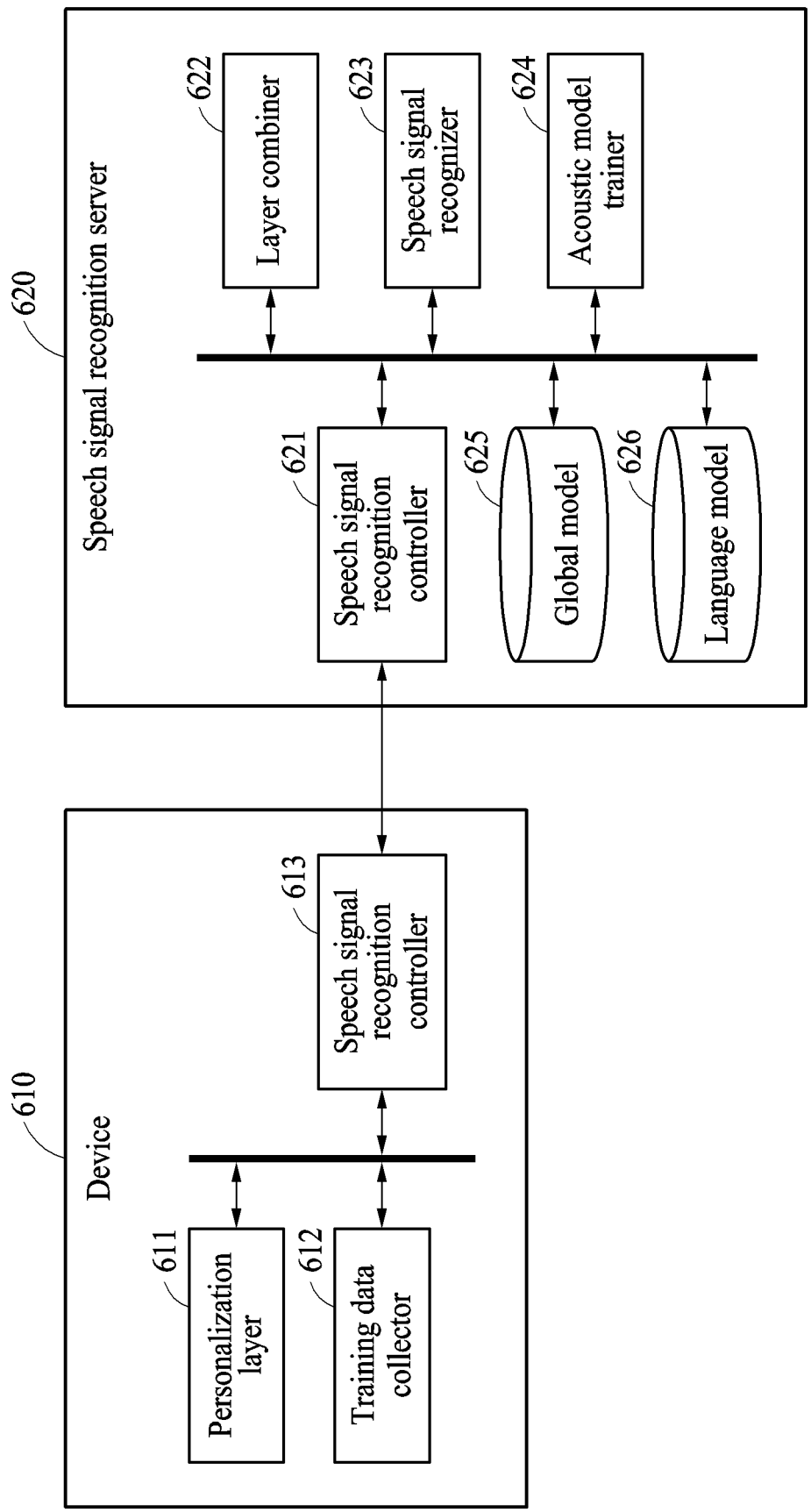
FIG. 6 is a block diagram illustrating an example of structures of a device and a speech signal recognition server of a speech signal recognition system.

FIG. 6 is a block diagram illustrating an example of structures of a device 610 and a speech signal recognition server 620 of a speech signal recognition system.

Referring to FIG. 6, the device 610 includes a speech signal recognition controller 613 configured to control elements of the device 610 to recognize a speech signal of a user. To control the device 610 by speaking to the device 610, the user may initiate a recognition operation by pressing a speech recognition button or selecting or executing a speech recognition application configured or executed in the device 610. The speech signal recognition controller 613 may output an interface, e.g., indicating that a preparation for an input of a speech signal is complete, to the user in response to the action by the user to initiate the recognition operation or the speech signal recognition controller 613 may merely monitor for the user's speech. The user may thus then speak an indication or identification of a function or service to be performed by or through the device 610, or speak an inquiry for data to be obtained from or by the device 610. The speech of the user may then be recognized by being converted into a speech signal by the device 610.

The device 610 generates a personalization layer 611 configured to represent learned speech features or aspects of the user of the device 610, e.g., with one or more processors of the device 610 implementing obtained trained parameters of the neural network, as the personalized layer 611. The trained parameters may be stored in a memory of the device 610. Considering that different users may operate different devices 610 in the speech signal recognition system, or that there may different users that operate the same device 610, trained parameters for respective personalization layer(s) 611 may be stored for each user of each device 610 and with each device 610. As noted, each personalization layer 611 may respectively reflect learned speech features or aspects of each corresponding user. Thus, in an example, the speech signal recognition system may prevent a difference in speech recognition performance between an individual using different devices that each include the same personalization layer 611 and may provide similar improved personalized speech recognition performance for different individuals using the same or different devices through respective particularly trained personalization layers 611.

In an example, when the user executes a speech recognition function or operation of the device 610, the speech signal recognition controller 613 transmits the personalization layer 611 to the speech signal recognition server 620. The personalization layer 611 may be transmitted in real time to the speech signal recognition server 620, or at different points in time before or after the capturing of the user's speech, dependent on settings of the speech signal recognition controller 613. In an example, transmissions of the personalization layer 611 may include transmissions of the trained parameters of the personalization layer 611. Further, the speech signal recognition controller 613 transmits the speech signal of the user to the speech signal recognition server 620.

The speech signal recognition server 620 includes a speech signal recognition controller 621 configured to control elements of the speech signal recognition server 620 to recognize the speech signal of the user. The speech signal recognition controller 621 receives the personalization layer 611 and the speech signal from the device 610. The speech signal recognition controller 621 transmits the received personalization layer 611 to a layer combiner 622.

The speech signal recognition server 620 further includes the layer combiner 622 configured to generate a corresponding acoustic model, for the particular user and for outputting a phonemic signal from the speech signal of the user of the device 610, by combining the received personalization layer 611 with a global model 625. For example, the received parameters of the personalization layer 611 may be combined with obtained trained parameters of the global model 625, e.g., obtained from a memory of the speech signal recognition server 620 storing the trained parameters of the global model 625. As non-limiting examples, the personalization layer 611 may be combined with the global model 625 by being positioned between an input layer and a first hidden layer of the global model 625, between any hidden layers of the global model 625, or between any final hidden layer and an output layer of the global model 625. That is, the layer combiner 622 augments the global model 625 using the personalization layer 611, to generate the acoustic model that is thereby personalized for the particular user. The personalization layer 611 may be combined with the global model 625 at varying positions based on trained features or characteristics of the combined acoustic model and/or determined features or aspects of the speech signal. The personalization layer 611 may also include plural layers that are respectively combined with the global model 625 at separate portions of the combined acoustic model, such as with at least one layer of the personalization layer 611 being separated, by at least one hidden layer of the global model 625, from another at least one layer of the personalization layer 611, as another non-limiting example. The generated acoustic model may thus be represented by trained parameters from the personalization layer 611 and trained parameters from the global model 625, e.g., in a configuration corresponding to their positioning in the generated acoustic model.

The speech signal recognition server 620 further includes a speech signal recognizer 623 configured to recognize the received speech signal based on the acoustic model generated by augmenting the global model 625 with the personalization layer 611. The speech signal recognition controller 621 transmits the received speech signal to the speech signal recognizer 623. The speech signal recognizer 623 inputs the speech signal into the input layer of the generated acoustic model. The speech signal recognizer 623 obtains a phonemic signal corresponding to the speech signal from the output layer of the generated acoustic model. The speech signal recognizer 623 obtains a text signal corresponding to the speech signal by inputting the obtained phonemic signal into a language model 626. The speech signal recognizer 623 transmits the obtained text signal to the speech signal recognition controller 621. The speech signal recognition controller 621 transmits the text signal to the device 610, or in detail, the speech signal recognition controller 613 of the device 610, for example.

The speech signal recognition server 620 may further include an acoustic model trainer 624 configured to train the generated acoustic model based on the received speech signal, based on information of another speech signal received from the device 610, or otherwise based on label information obtained by the device 610 or the speech signal recognition server 620. For example, while the device 610 is recognizing the speech signal as described above, the acoustic model trainer 624 may determine whether to use the received speech signal, and/or such other information, to further train the generated acoustic model. When the received speech signal is determined to be used to train the generated acoustic model, the acoustic model trainer 624 changes or adjusts parameters, e.g., connections and/or kernel weights, of the generated acoustic model based on a result of recognizing the received speech signal. For example, such changes or adjustments may be with respect to parameters of the global model 625 and/or parameters of the personalization layer 611, results of which would thus represent a further trained global model 625 and/or further trained personalization layer 611 when the respective adjusted parameters are thereafter separately considered. For example, the acoustic model trainer 624 may transmit the further trained personalization layer 611 included in the parameter adjusted acoustic model to the speech signal recognition controller 621, and the speech signal recognition controller 621 may transmit the received further trained personalization layer 611 to the device 610. In such examples, the further trained personalization layer 611 may be transmitted as the adjusted parameters resulting from the further training of the corresponding layers of the acoustic model, and any adjusted parameters resulting from the further training, if implemented, of the global model 625 may thereafter be stored in the memory of the speech signal recognition server 620, e.g., as an updated global model 625. Thus, the acoustic model trainer 624 may train the personalization layer 611 based on the speech signal of the user of the device 610, or another speech signal of the user of the device, as discussed above. The further trained personalization layer 611 may then be utilized to recognize another speech signal of the user of the device 610 to be input later, e.g., by subsequent implementation of speech recognition by the device 610.

In addition to a case of utilizing the speech signal to train the personalization layer 611 in real time, the speech signal recognition system may train the personalization layer 611 based on speech signals collected by the device 610 during a predetermined period. In this example, the device 610 further includes a training data collector 612 configured to collect speech signals of the user and the recognition result text signal corresponding to the speech signals as training data. The training data collector 612 may collect a speech signal for which speech recognition has been performed incorrectly, for example, a speech signal that is repeatedly input.

The speech signal recognition controller 613 may determine whether or when to train the personalization layer 611, in view of a state of the device 610 or the speech signal recognition server 620. For example, the speech signal recognition controller 613 may determine to train the personalization layer 611 during a time when the user is determined to not typically use the device 610, for example, during determined periods when the user sleeps. When training of the personalization layer 611 is determined to be performed, the speech signal recognition controller 613 transmits the personalization layer 611 and the speech signal(s) collected by the training data collector 612 to the speech signal recognition server 620. When transmitting the personalization layer 611 and the speech signal(s) collected by the training data collector 612, the speech signal recognition controller 613 requests the speech signal recognition server 620 to train the personalization layer 611.

In response to reception of the request for training the personalization layer 611 from the device 610, the speech signal recognition controller 621 determines whether to train the personalization layer 611 based on the state of the speech signal recognition server 620, for example, a memory or storage capacity of the speech signal recognition server 620. When, based on the determined state for example, the speech signal recognition controller 621 determines to perform the training of the personalization layer 611, the speech signal recognition controller 621 transmits the received personalization layer 611 and the speech signal and/or other collected information collected by the training data collector 612 to the acoustic model trainer 624.

The acoustic model trainer 624 may then train the personalization layer 611 based on the collected speech signal (s), train the personalization layer 611 additionally, or performs fine tuning. For example, in an initial operation the personalization layer 611 of the device 610 may be represented by trained parameters for generic recognition for any user or any user of predetermined similar speech, and the acoustic model trainer 624 may then perform training of the personalization layer 611 to be personalized to the speech features or aspects particular to the particular user. Alternatively, the personalization layer 611 may already be trained at least once before for the particular user's speech features or aspects and the personalization layer 611 may thus be additionally trained by the acoustic model trainer 624, or the personalization layer 611 may have been trained multiple times before particular to the user and thus the training of the personalization layer 611 may only include fine tuning by the acoustic model trainer 624, e.g., with lesser or less number of adjustments or adjustment passes than the other types of training. Thus, personalization layers 611 included in different devices when operated by different users may be trained based on different speech signals collected for the respective different users. Thus, the personalization layers 611 included in the different devices each learn unique speech features or aspects of a corresponding user, for example, a unique dialect, accent, or tone of the user. The acoustic model trainer 624 determines whether to transmit the personalization layer 611 to the device 610 based on a determined confidence of the changed personalization layer 611. When transmitting the personalization layer 611 to the device 610, the changed personalization layer 611 is stored in the device 610, and subsequently utilized to recognize another speech signal of the user of the device 610 to be input later. In addition, if the speech signal recognition server 620 includes information of other devices operated by the same user, or the device 610 or such other corresponding devices 610 indicate the same to the speech signal recognition server 620, the speech signal recognition server 620 may provide the updated personalization layer 611 to each of the devices 610 for use when the particular user is operating the particular devices 610.

Above is described an example of performing speech recognition by transmitting the personalization layer 611 of the device 610 to the speech signal recognition server 620, and training the personalization layer 611 with respect to speech features or aspects of a particular user by the speech signal recognition server 620. In an example, the device 610 may alternatively be provided the global model 625, and training based on the particular speech features or aspects of the particular user may be performed by the device 610 with respect to the personalization layer 611 and the received global model 625 by the device 610. Also, with respect to FIG. 6, the training data collector 612 and the speech signal recognition controller 613 are each representative of being one or more processors or hardware computing devices or are, in any combination, representative of respective configured operations of such one or more processors or hardware computing devices of the device 610. Similarly, the speech signal recognition controller 621, layer combiner 622, speech signal recognizer 623, and acoustic model trainer 624 are each representative of being one or more processors or hardware computing devices or are, in any combination, representative of respective configured operations of such one or more processors or hardware computing devices of the speech signal recognition server 620. Still further, examples include one device 610 including the components of, and acting as, the speech signal recognition server 620 with another device 610 performing the capturing of the speech signal and providing results of the speech recognition to the user or either of the devices 610 performing further operations or services in response to the speech recognition. In such an example, the device 610 performing the capturing of the speech and having, or having access to, the personalization layer 611 of the operating user may be considered a master device and the device 610 operating as the speech signal recognition server 620 may be considered the slave device, as non-limiting examples.

Figure 7:
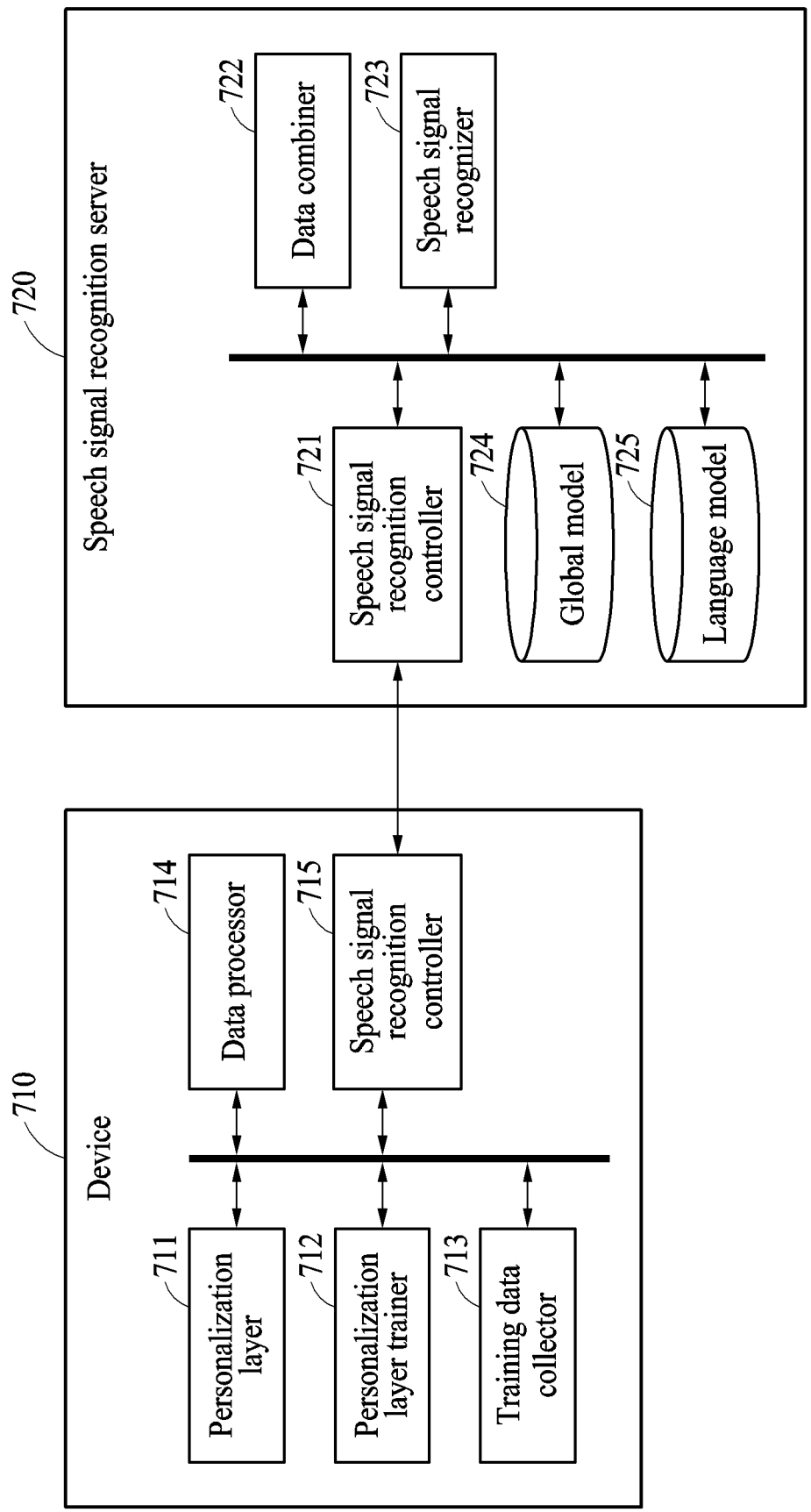
FIG. 7 is a block diagram illustrating an example of structures of a device and a speech signal recognition server of a speech signal recognition system.

FIG. 7 is a block diagram illustrating an example of structures of a device 710 and a speech signal recognition server 720 of a speech signal recognition system. Description of elements and corresponding operations of FIGS. 1-6 are also applicable to similar elements of FIG. 7, and thus repeated descriptions of the same will be omitted herein merely for brevity and conciseness.

An operation of recognizing a speech signal in the speech signal recognition system of FIG. 7 may be performed similar to that described with reference to FIG. 2. For example, a data processor 714 preprocesses a speech signal obtained from a user of the device 710 and inputs the resulting preprocessed speech signal into a personalization layer 711. A data combiner 722 inputs an output signal of the personalization layer 711 into a global model 724. A speech signal recognizer 723 generates a text signal corresponding to the speech signal using a language model 725 and dependent on results of the global model 724. The generated text signal may be provided to the device 710.

A speech signal recognition controller 715 may also obtain the global model 724 from the speech signal recognition server 720 to train the personalization layer 711. The speech signal recognition controller 715 determines whether or when to train the personalization layer 711, e.g., in view of any one or any combination of whether the device 710 is determined to be connected to a computer, which may or may not be distinct from the speech signal recognition server 720, a memory capacity of the device 710, and a network connection state of the device 710, for example, whether a wired or Wi-Fi connection is available or whether the device has an active wired or Wi-Fi connection. Thus, when the performance of the training of the personalization layer 711 is determined, the speech signal recognition controller 715 requests the speech signal recognition server 720 to transmit the global model 724.

A speech signal recognition controller 721 transmits the global model 724 to the device 710 in response to the request for transmission of the global model 724. The speech signal recognition controller 715 transmits the received global model 724 to a personalization layer trainer 712. The personalization layer trainer 712 generates an acoustic model configured to output a phonemic signal from the speech signal of the user by combining the global model 724 with the personalization layer 711, such as described above with respect to the layer combiner 622 of FIG. 6. Thus, the personalization layer 711 is combined with the global model 724 at varying or different positions based on trained features or characteristics of the combined acoustic model and/or determined features or aspects of the speech signal. The personalization layer trainer 712 may use the speech signal of the user of the device 710, e.g., as collected by a training data collector 713, to train the acoustic model. The personalization layer trainer 712 trains the acoustic model based on the collected speech signal, and obtains the trained personalization layer 711, or further trained personalization layer 711, having the learned speech features or aspects of the user from a result of training the acoustic model. The trained or further trained personalization layer 711 may then be stored in the device 710 as the updated personalization layer 711 and used in future speech recognition for the particular user.

Thus, typically speech recognition performances differ from user to user since users using a speech signal recognition system have different speech features or aspects, for example, dialects, accents, or tones. In one or more example, the speech signal recognition system of any of FIGS. 1-7 may minimize differences in respective speech recognition performances between different users by using respective personalization layers 711 stored for each user for each device 710, where the respective personalization layers 711 are respectively trained for the particular speech features or aspects of each user of the corresponding device 710. Thus, though the personalization layers 711 for different users would be distinct, respective speech recognition performances for multiple users may all be improved and more consistent. In addition, in an example, when personalization layers 711 are not stored in the speech signal recognition server 720 to which the devices 710 are connected, or only provided to the speech signal recognition server 720 when further training the respective personalization layers 711, costs for generating and storing the personalization layers 711 respectively corresponding to the plurality of users using the speech signal recognition system may reduced and personal security enhanced.

As an example of such enhanced security, while recognizing of the speech signal using the personalization layer 711 may be performed with the device 710 transmitting the personalization layer 711 and the speech signal to the speech signal recognition server 720, security may be enhanced by transmitting only an output signal obtained by inputting the speech signal into the personalization layer 711 to the speech signal recognition server 720. In particular, when transmitting only the output signal of the personalization layer 711 to the speech signal recognition server 720, a unique speech features or aspect of the user of the device 710 may not be leaked to an external device, for example, the speech signal recognition server 720.

Also, when training the personalization layer 711 based on the speech features or aspects of the particular user, the device 710 may transmit the personalization layer 711 and the speech signal collected from the user to the speech signal recognition server 720 for further training of the personalization layer 711, and then receive the further trained personalization layer 711 having been further trained based on the particular speech features or aspects of the particular user from the speech signal recognition server 720. Alternatively, in another example and with potential enhanced security, the device 710 may receive the global model 724 of the speech signal recognition server 720 for the training of the personalization layer 711, obtains an acoustic model completed by combining the personalization layer 711 with the global model 724, and obtains a further trained the personalization layer 711 based on the particular speech features or aspects of the user through training the obtained acoustic model and based on the collected speech signal.

Also, with respect to FIG. 7, the data processor 714, the personalization layer trainer 712, the training data collector 713, and the speech signal recognition controller 715 are each representative of being one or more processors or hardware computing devices or are, in any combination, representative of respective configured operations of such one or more processors or hardware computing devices of the device 710. Similarly, the speech signal recognition controller 721, data combiner 722, and speech signal recognizer 723 are each representative of being one or more processors or hardware computing devices or are, in any combination, representative of respective configured operations of such one or more processors or hardware computing devices of the speech signal recognition server 720. Still further, examples include one device 710 including the components of, and acting as, the speech signal recognition server 720 with another device 710 performing the capturing of the speech signal and providing results of the speech recognition to the user or either of the devices 710 performing further operations or services in response to the speech recognition. In such an example, the device 710 performing the capturing of the speech and having, or having access to, the personalization layer 711 of the operating user may be considered a master device and the device 710 operating as the speech signal recognition server 720 may be considered the slave device, as non-limiting examples.

Each of the referenced memories, such as represented by each of the personalization layers 1-7, personalization layers 211, 310, 611, and 711, global model 140, language model 226, global model 320, global model 625, language model 626, global model 724, and language model 725, terminals 101 and 102, speech recognition speaker 103, speech recognition TV 104, speech signal recognition server 130, data processor 214, personalization layer trainer 212, speech signal recognition controller 215, training data collector 213, device 210, speech signal recognition server 220, speech signal recognition controller 221, data combiner 222, speech signal recognizer 223, global model trainer 224, device 610, training data collector 612, speech signal recognition controller 613, speech signal recognition server 620, speech signal recognition controller 621, layer combiner 622, speech signal recognizer 623, acoustic model trainer 624, device 710, personalization layer trainer 712, training data collector 713, data processor 714, speech signal recognition server 720, speech signal recognition controller 721, data combiner 722, and speech signal recognizer 723, as non-limiting examples, in FIGS. 1-7 and that perform the operations described in this application are implemented as and by corresponding hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD- Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented speech signal recognition method, comprising:
    obtaining an output of a personalization layer, with respect to a speech signal provided by a user of a terminal, having been implemented by input of the speech signal to the personalization layer, the personalization layer being previously trained based on speech features of the user;
    providing the obtained output of the personalization layer to the global model, the global model being configured to output a phonemic signal indicating a phoneme included in the speech signal through the global model being previously trained based on speech features common to a plurality of users; and
    re-training the personalization layer based on the phonemic signal output from the global model,
    wherein the personalization layer and the global model collectively represent an acoustic model.

2. The method of claim 1, wherein the terminal performs the re-training of the personalization layer in furtherance of a re-training of the acoustic model begun with a re-training of the global model by a speech signal recognition server based on the speech signal.

3. The method of claim 2, wherein the speech signal recognition server implements of the global model with respect to the provided output of the personalization layer, to complete an implementation of the acoustic model to indicate the phoneme.

4. The method of claim 1, wherein a speech signal recognition server performs the obtaining of the output of the personalization layer and performs the implementing of the global model, and
    the speech signal recognition server performs the re-training of the personalization layer, wherein the performing of the re-training includes forwarding the re-trained personalization layer to the terminal for use in a subsequent speech recognition.

5. The method of claim 1, wherein the global model is configured to be utilized in speech recognition for each of the plurality of users in respective combination with different personalization layers particular to each of the plurality of users, and the global model is stored in a speech signal recognition server configured with a language model to change results of each of the speech recognition for each of the plurality of users to respective text signals,
    wherein the different personalization layers are configured in different terminals and respectively trained for speech features of corresponding different users.

6. The method of claim 5, further comprising determining whether to implement the personalization layer for an input speech signal based on a determined connection state between the terminal and the speech signal recognition server.

7. The method of claim 5, wherein the implementing of the global model comprises transmitting the output of the personalization layer from the terminal to the speech signal recognition server, with the speech signal recognition server inputting transmitted output into the global model to output the phonemic signal.

8. A processor implemented speech signal recognition method, comprising:
    inputting a speech signal into a personalization layer stored in a terminal in response to reception of the speech signal from a user of the terminal; and
    obtaining a text signal corresponding to the speech signal based on a provision of an output signal of the personalization layer into which the speech signal is input to a global model, the global model being configured to output respective phonemic signals for respective speech recognitions based on each of output signals from different personalization layers respectively for a plurality of users,
    wherein the personalization layer is previously trained based on speech features of the user, and the global model is previously trained on speech features common to the plurality of users, and
    wherein the obtaining of the text is based on a result of the global model having output respective indications of one or more phonemes, as an output phonemic signal of the global model with respect to the provided output signal of the personalization layer.

9. The method of claim 8, wherein a combination of implementation of the personalization layer and of implementation of the global model collectively represents an implementation of a personalized acoustic model trained based on the speech features of the user and the speech features common to the plurality of users, and a combination of implementation of another personalization of another user and another implementation of the global model collectively represents an implementation of a different personalized acoustic model.

10. The method of claim 9, wherein the implementation of the personalized acoustic model includes implementing the personalization layer on a processor of the terminal, the terminal being remote from another computing device including another processor that implements the global model by providing the output signal of the personalization layer, transmitted from the terminal to the other computing device, to the global model.

11. The method of claim 10, wherein the other computing device is configured to generate the text signal through a provision of a result of the implementation of the global model to a language model stored on the other computing device, and wherein the obtaining of the text signal includes receiving the generated text signal from a transmission, from the other computing device to the terminal, of the generated text signal, generated control signals based on the generated text signal, or other information dependent on the generated text signal.

12. The method of claim 8, wherein the global model is stored in a speech signal recognition server, remote from the terminal, configured to obtain text signals for respective speech signals from the plurality of users each based on the output signals from the different personalization layers of corresponding plural terminals of the plurality of users, each different personalization layer being separately trained based on respectively different speech features of different corresponding users.

13. The method of claim 8, further comprising:
determining whether to use the speech signal to re-train the personalization layer based on the text signal being determined inaccurate.

14. A terminal, comprising:
a speech signal collector configured to collect a speech signal of a user of the terminal;
a memory configured to store a personalization layer trained with speech features of the user; and
a processor configured to implement speech recognition of the speech signal of the user using the personalization layer and based on results of an implemented global model, provided an output signal of the personalization layer, that determines a phonemic signal indicating a phoneme included in the speech signal,
wherein the global model is trained with speech features common to a plurality of users, and
wherein the processor is further configured to indicate a result of the recognition or perform a service in response to the result of the recognition, with the result of the speech recognition being dependent on a text signal that is dependent on the determined phonemic signal and corresponding to the speech signal of the user.

15. The terminal of claim 14, wherein the implemented global model is a remotely implemented global model, implemented in a computing device remote from the terminal.

16. The terminal of claim 14, wherein the processor is configured to:

provide the output signal to a speech signal recognition server with respective communication with respective plural terminals of the plurality of users, including the terminal, and configured to store and perform the implementation of the global model, and
re-train the personalization layer to generate the output signal based on the speech features of the user, using a back propagation or gradient descent training approach based on the determined phonemic signal resulting from the implementation of the global model by the speech signal recognition server.

17. The terminal of claim 14,
wherein the speech signal collector is configured to selectively store the speech signal based on a determination of an accuracy of the text signal, and
wherein the processor is further configured to:
obtain the global model from a speech signal recognition server with respective communication with respective plural terminals of the plurality of users, including the terminal, and configured to store the global model;
obtain an acoustic model, configured to output the determined phonemic signal from the speech signal, by combining the personalization layer with the obtained global model; and
obtain an updated personalization layer having been re-trained based on corresponding speech features of the user, the re-training of the personalization layer including re-training the obtained acoustic model based on the stored speech signal.

18. The terminal of claim 17, wherein the re-training of the obtained acoustic model is performed using a back propagation or gradient descent training approach, and the obtaining of the updated personalization layer further includes storing parameters of the re-trained obtained acoustic model corresponding to the personalization layer as the updated personalization layer in the memory for use in a subsequent speech recognition by the processor.

19. The terminal of claim 14,
wherein the speech signal collector is configured to selectively store the speech signal based on a determination of an accuracy of the text signal, and
wherein the processor is further configured to:
transmit the personalization layer and the stored speech signal to a speech signal recognition server with respective communication with respective plural terminals of the plurality of users, including the terminal, and configured to store the global model; and
receive an updated personalization layer from the speech signal recognition server, the updated personalization layer having been re-trained by the speech signal recognition server based on corresponding speech features of the user through a re-training of an acoustic model, obtained by the speech signal recognition server through combination of the transmitted personalization layer and the global model, using the transmitted speech signal.

* * * * *